United States Patent [19]
Amberg

[11] 4,035,222
[45] July 12, 1977

[54] APPARATUS FOR PRODUCING SHRUNKEN PILFER-PROOF NECK LABELS FOR CONTAINERS

[75] Inventor: Stephen W. Amberg, Toledo, Ohio

[73] Assignee: Owens-Illinois, Inc., Toledo, Ohio

[21] Appl. No.: 687,957

[22] Filed: May 19, 1976

Related U.S. Application Data

[62] Division of Ser. No. 526,124, Nov. 22, 1974.

[51] Int. Cl.² .................................... B29C 27/02
[52] U.S. Cl. .......................... 156/423; 156/446; 156/497; 156/510; 425/305.1; 425/436 R; 156/DIG. 15; 156/DIG. 25
[58] Field of Search .............. 425/403, 436 R, 317, 425/324 R, 289, 446, 404, 305 R; 29/282, 200 R, 447; 156/446, 86, 89, 203, 256, 258, DIG. 5, 218, DIG. 12, DIG. 14, DIG. 24, DIG. 25, DIG. 15, 497, 510

[56] References Cited

U.S. PATENT DOCUMENTS

| | | | |
|---|---|---|---|
| 2,223,017 | 11/1940 | Abrams et al. | 156/86 X |
| 2,790,285 | 4/1957 | Pike et al. | 156/86 X |
| 3,764,425 | 10/1973 | Neff et al. | 156/218 X |

Primary Examiner—Robert L. Spicer, Jr.
Attorney, Agent, or Firm—J. R. Nelson

[57] ABSTRACT

The invention disclosed sets forth a machine for forming a sleeve of a shrinkable, cellular polymeric material from a predecorated web. The web is processed to provide (1) a partial-depth slit along the longitudinal dimension, and (2) cross-dimension pleats. Predecorated shrunken neck labels are formed from the web for overlying the neck and closure of the bottle and including a pilfer-proof feature. Such a label is formed from the processed web by cutting a blank having the cross pleats therein and winding the blank on a mandrel to overlap the ends and seam the overlap to make a sleeve. The sleeve is stripped onto the top neck end and over the closure of a bottle at room temperature to a label position and shrunken to a snug fit, the pleats absorbing wrinkles that occur in shrinking the material onto a "cold" bottle.

The disclosure includes a novel machine for making the sleeve from a plastic web and placing it on the bottle. There is disclosed a combination of novel devices in the machine including a slitting device, pleating device, feed and winding device, hot air heating device for sealing the seam of a sleeve and for pressing the seam, and an article handling mechanism for indexing the bottles coaxially with a sleeve and transferring the sleeve over the bottle to label position at production rates. With the sleeves of shrinkable label material thusly placed, the bottles are carried through a device for heating the label sufficiently to shrink it to final form. There is also disclosed the step and means for treating the bottle with adhesive before transferring the label sleeve onto it, providing an adhesive bond between the neck of the bottle and the shrunken label sleeve which enhances the function of the pilfer-proof label.

1 Claim, 32 Drawing Figures

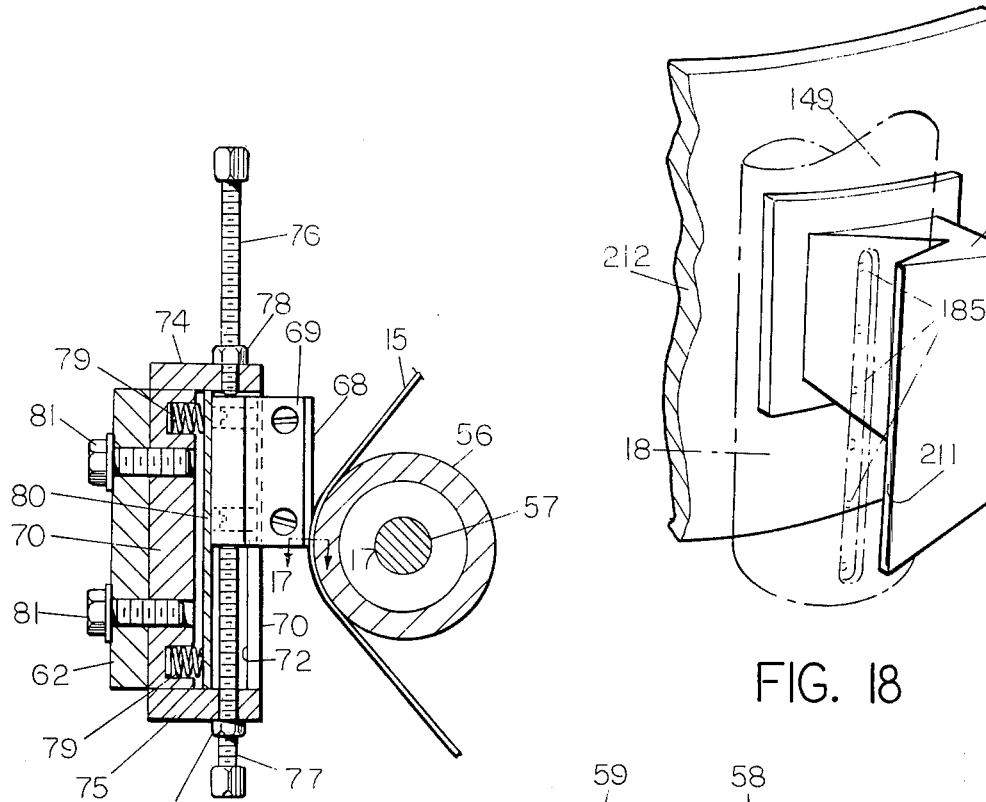
FIG. 16
FIG. 18
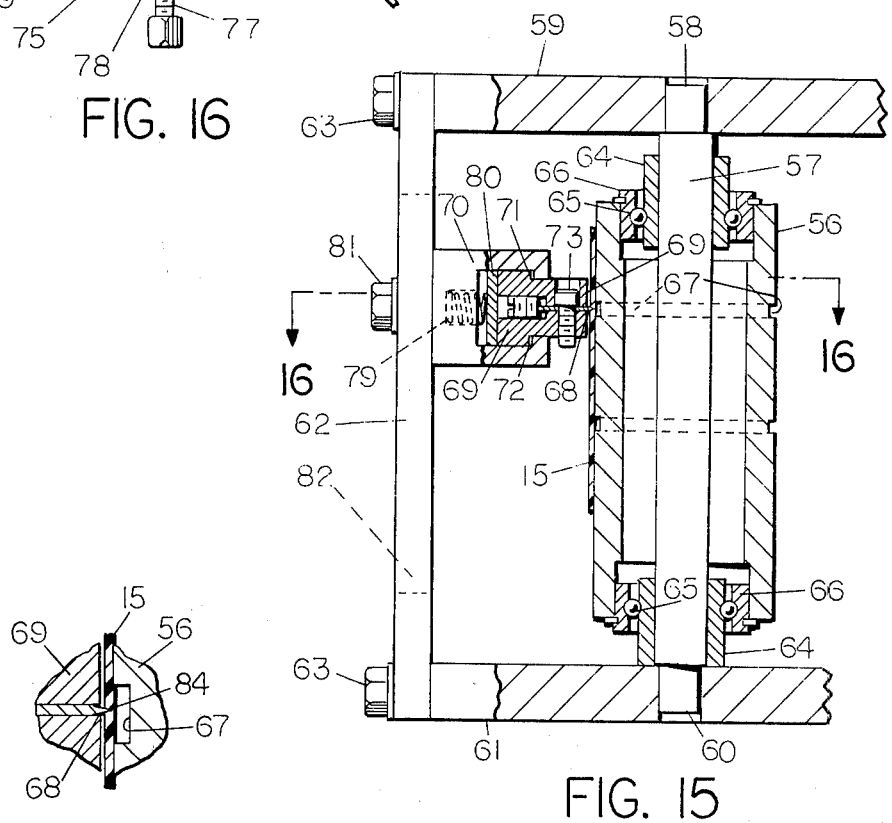
FIG. 15
FIG. 17

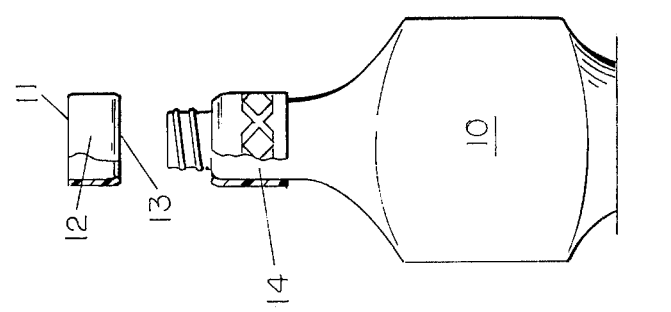
FIG. 30
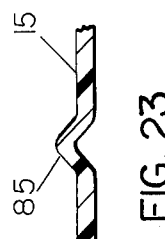
FIG. 23
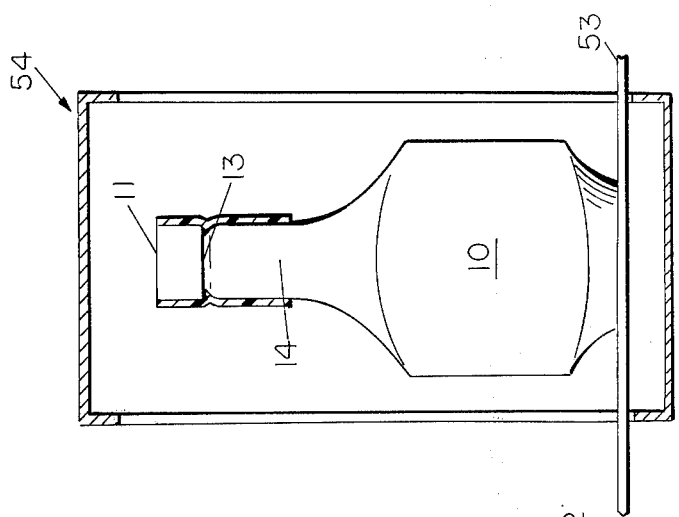
FIG. 26
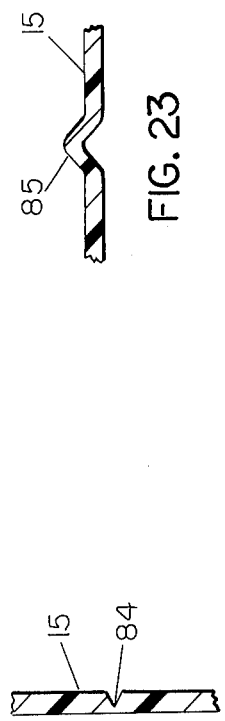
FIG. 22
FIG. 25
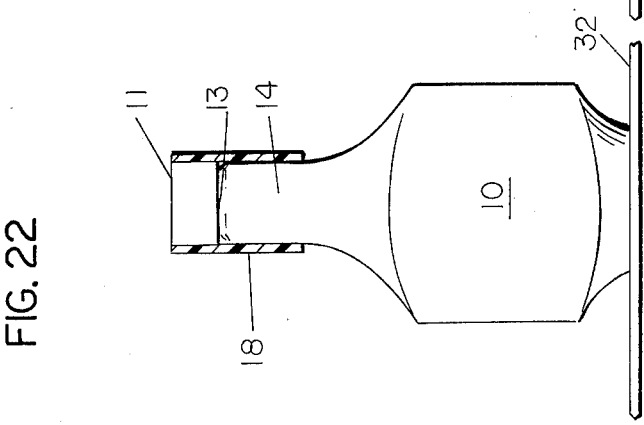
FIG. 24

APPARATUS FOR PRODUCING SHRUNKEN PILFER-PROOF NECK LABELS FOR CONTAINERS

This is a division of application Ser. No. 526,124 filed Nov. 22, 1974.

The invention relates to apparatus for making labels for containers of shrinkable, polymeric material that are predecorated in web form and transferred onto an ambient temperature container and heat shrunken onto the container for snugly encircling the neck and closure portions of the container. Preferably, in the case of bottles having screw caps, for example, the shrunken label will also include a pilfer-proof feature of the type that visually signifies tampering with or initial removal of the closure.

BACKGROUND OF THE INVENTION

The invention disclosed in my earlier-filed co-pending U. S. application, Ser. No. 514,370 filed Oct. 15, 1974 (now U.S. Patent No. 3,951,292), entitled "Pilfer-Proof Neckband for a Bottle" provided a need for a production machine and process to produce the labelled bottles.

Since the nature of the product calls for shrinking a cellular polymeric material that is oriented for contraction upon sufficient heating onto a glass bottle, for example, that is filled with a product such as food, beverage or beer, the encircling label needs to be contracted onto a relatively cold bottle without benefit of preheat. The cellular material, on the other hand, is a heat insulator and has a relatively low thermal transmission rate through the material from its outside to inside surfaces. In prior processes, such as my U.S. Pat. Nos. 3,767,496 and 3,802,942, the cellular polymeric material has been subjected to heating on opposite surfaces by preheating the base article to which the encircling form of the material is applied to a temperature of 225° F or more. When applying the encircling form of cellular, shrinkable material on capped bottles containing food products or the like, it should be apparent that preheating of this nature is impractical, and the bottles need be at ambient temperature when the shrinking by heat takes place. This requires shrinking the material onto the "cold" bottle by applying heat sufficient for shrinking it from the external surface. In so doing, the insulating effect of the cellular plastic invariably creates wrinkles in the encircling material as it is shrunken. When using the material as a label or for decorative purposes on the bottle, the random and uncontrolled wrinkling in the material as it shrinks produces an unsatisfactory appearance of the product.

SUMMARY OF THE INVENTION

In the present invention, a practical machine is devised for applying a hollow tubular sheath or sleeve of a shrinkable organic thermoplastic material, especially of cellular material, over the neck and closure skirt portions of a cold bottle and controlling the wrinkles of the product resulting in a superior labelled product from the standpoint of appearance and performance. The machine also provides for making the product pilfer-proof by partially slitting the thickness of the material along a line that will be along the annular perimeter of the skirt edge of the bottle closure, and opening the bottle by unscrewing the cap or tampering with it causes a visual sign by the severing of the label on this annular score line. To assure the sleeve label is firmly on the neck of the bottle and such line severing will occur, the invention provides for adhesively securing the neck overlying portion of the label onto the bottle where necessary. In the preferred form of the machine, the bottle neck is pretreated with an adhesive. One convenient adhesive is an aqueous emulsified type which dries to a tacky condition on the glass. The shrunken sleeve is adhered to the neck of the bottle similar to the action of a pressure sensitive type adhesive, thereby bonding that portion of the shrunken label firmly onto the bottle surface. Twisting of the label portion over the cap skirt assures severing the label along the line of the partial-depth slit dividing it into upper and lower portions on the closure skirt and bottle neck, respectively.

The present invention also provides a machine capable of automatic production for making the sleeves of the shrinkable material from a predecorated or preprinted web supply and assembling the sleeves onto the upper ends of the capped bottles handled in the machine and registered thereby. The bottles receiving the label sleeves are discharged from the machine and conveyed in a heating device that will apply the proper heating for shrinking the labels in place to complete the package.

In the machine, subcombination structures provide the following:

1. The web supply is processed through a knife device making a longitudinal line, partial-depth slit in the material.

2. The web is moved past a device for forming cross-flutes or pleats in the material at spaced intervals so that each sleeve length taken from the web will have two or more pleats therein.

3. The web is then moved onto a feed device which measures a length of the material on a drum surface and a rotary cutter severs the length on the drum into a label blank. The drum carries the leading end of the blank into engagement with a rotary mandrel that has a cylindrical winding surface somewhat less in peripheral dimension than the length of the blank.

4. The rotary mandrel mechanism is provided with a vacuum at the periphery to hold the label blank in place, and a mechanism operates the mandrel to rotate it about its longitudinal axis for wrapping or winding the blank strip thereon. Several mandrels are carried on a rotary turret of the machine and each mandrel unit includes a hot air nozzle system for heat welding or bonding the overlapped ends of the blank on the mandrel. Hot air is furnished by the nozzle which extends the length of the overlapping seam of the blank at a time just before the opposite ends — the leading and trailing ends of the blank — are about to overlie one another. The heat is sufficient upon engagement of the overlapped portions to join or heat seal the material at a side seam and form a sleeve.

5. A blank guide block is employed on the machine and it situated adjacent the path of the mandrels in turret rotation. The guide block face is perforated and parallels the path of the mandrels beyond the feed drum. A suction is pulled at the guide block in a direction away from the mandrel, and during travel past the perforated guide surface the free end portion of the blank (the portion not wrapped on the surface of the mandrel) is controlled.

6. A press roll device is situated in the path of the mandrels just beyond the guide block for an engagement with the seam of the sleeve on the mandrel for pressing that heated area of the sleeve, and, if need be, somewhat compressing the overlapping thicknesses of material to smooth out or "feather" the seam on the label.

7. The machine includes a bottle handling apparatus which times the entry of bottles into the machine and conveys them into an indexed co-axial position of registry under a mandrel. The mandrel device includes an axial stripping mechanism which is operated to drive the sleeve from the mandrel and over the bottle cap and neck to its label position.

8. The machine includes with the bottle timing device an applicator device for applying a quantity of adhesive to the bottle neck as it enters the machine.

9. A drive system operates the various devices synchronously, where need be, to perform a continuous production of the machine.

Although the machine herein described are characterized in terms of the preferred embodiment, namely, the production of a shrink labelled glass bottle, the invention may be utilized in forming a sleeve of the material and applying it and shrinking it over a variety of articles, including for example plastic bottles, cans, jars, tumblers or containers of various types and forms.

Various combinations of utilization of the subcombinations in the disclosed machine, or in modifications for utilization of the machine for the production of various articles or products thereon will undoubtedly occur to those skilled in the art. Although a preferred embodiment is herein disclosed, such disclosure is in no way intended as limiting the invention beyond the scope set out in the appended claims.

BRIEF DESCRIPTION OF THE DRAWINGS

FIG. 15 is a sectional elevational view taken along line 15—15 on FIG. 3.

FIG. 16 is a sectional plan view taken along line 16—16 on FIG. 15.

FIG. 17 is a fragmentary sectional elevational view taken along line 17—17 on FIG. 16, illustrating the partial-depth cutting position of the knife element on the web.

FIG. 18 is a perspective view of the hot air nozzle for heat sealing the overlapped ends of a blank on the mandrel.

FIG. 22 is a fragmented sectional elevational view taken along line 22—22 on FIG. 21.

FIG. 23 is a fragmented sectional elevational view taken along line 23—23 on FIG. 21.

FIG. 24 is a side elevational view of a bottle illustrating the application of a spot of adhesive material onto the neck surface.

FIG. 25 is a side elevational view, partly in section, of a bottle shown on FIG. 24 with a label sleeve of heat shrinkable, cellular polymeric material assembled to label position prior to shrinking.

FIG. 26 is a side elevational view, partly in section, of the bottle and label of FIG. 25 undergoing heat treatment for shrinking the label sleeve onto the bottle closure and neck.

FIG. 30 is a side elevational view, partly broken away and in section, of the bottle and closure in use and employing the visible pilfer-proofing feature of the invention.

GENERAL DESCRIPTION OF THE MACHINE

Figure 1:
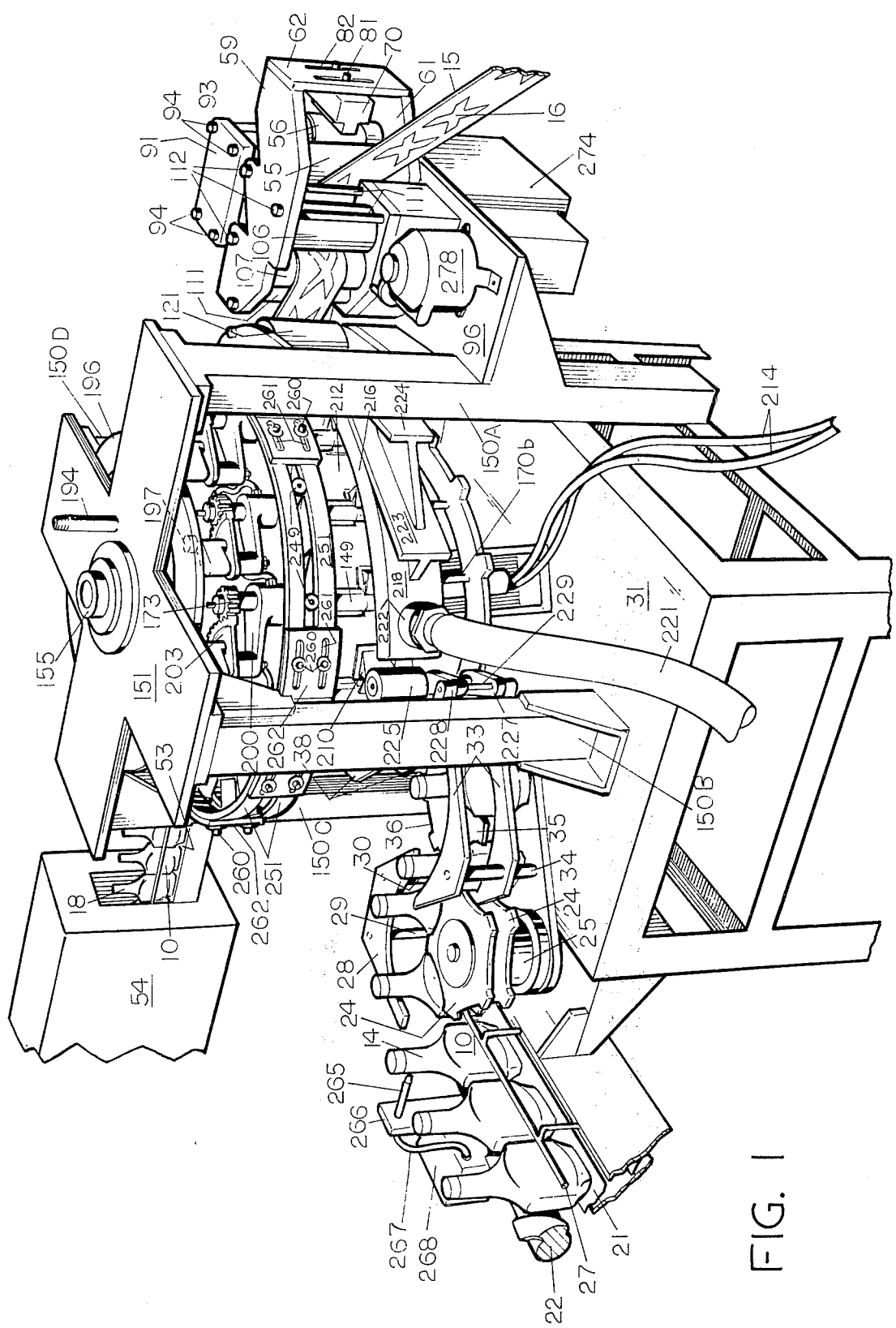
FIG. 1 is a perspective view of the machine of the invention.

The machine comprises several components connected together to operate as a unit for the production of plastic sleeves shrunken over the neck and closure of a container, such as a bottle. The example of the present disclosure is a glass bottle 10, such as shown on FIG. 24. Bottle 10 is provided with a conventional screw cap 11 which includes an annular skirt portion 12. The cap skirt has a lower terminal edge 13 that encircles the upper part of the neck 14 of bottle 10.

Figure 29:
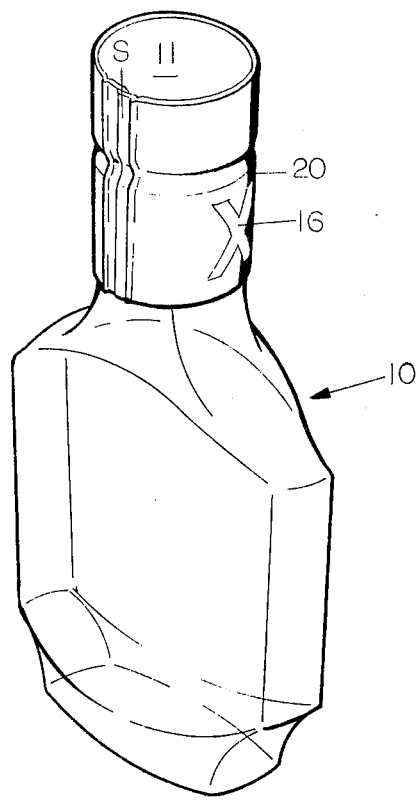
FIG. 29 is a perspective view of the bottle and shrunken label made according to the invention.
Figure 27:
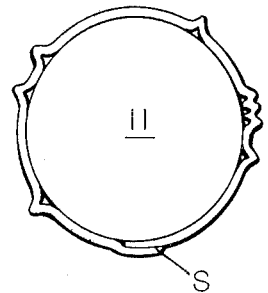
FIG. 27 is a top plan view of a label shrunken onto a cold bottle illustrating the effect of random wrinkling of the label without employing the beneficial features of the present invention.

The object of the invention is to apply a plastic label covering on the neck area 14, or a portion thereof, and cap skirt 12. This is done by first forming a (preferably) pre-decorated, shrinkable, foamed plastic sleeve from a web of oriented polystyrene plastic, for example, on the order of 10 to 20 thousandths of an inch in thickness. The plastic web 15 is brought to the machine as a roll and mounted on a conventional supply reel (not shown). A multicolor decoration 16 is pre-printed repeatedly along one surface of the supply web 15. The print or decoration 16 for a label is contained over a longitudinal span on web 15 a bit less than the length dimension of a blank 18 (FIG. 21) to be cut from web 15. There are spaced indicia (not shown) printed along the lengthwise dimension of a blank 18. Each decoration copy is placed on the web between these indicia marks. The width dimension 19 of web 15 (or blank 18) is equal to the height dimension of the label 20 after it is shrunken on the bottle 10 (FIG. 29). The material of the supply roll of web 15 is oriented (stretched) in the longitudinal dimension of the web. There is little or no orientation in the material in the cross dimension 19.

BOTTLE HANDLING

Figure 2:
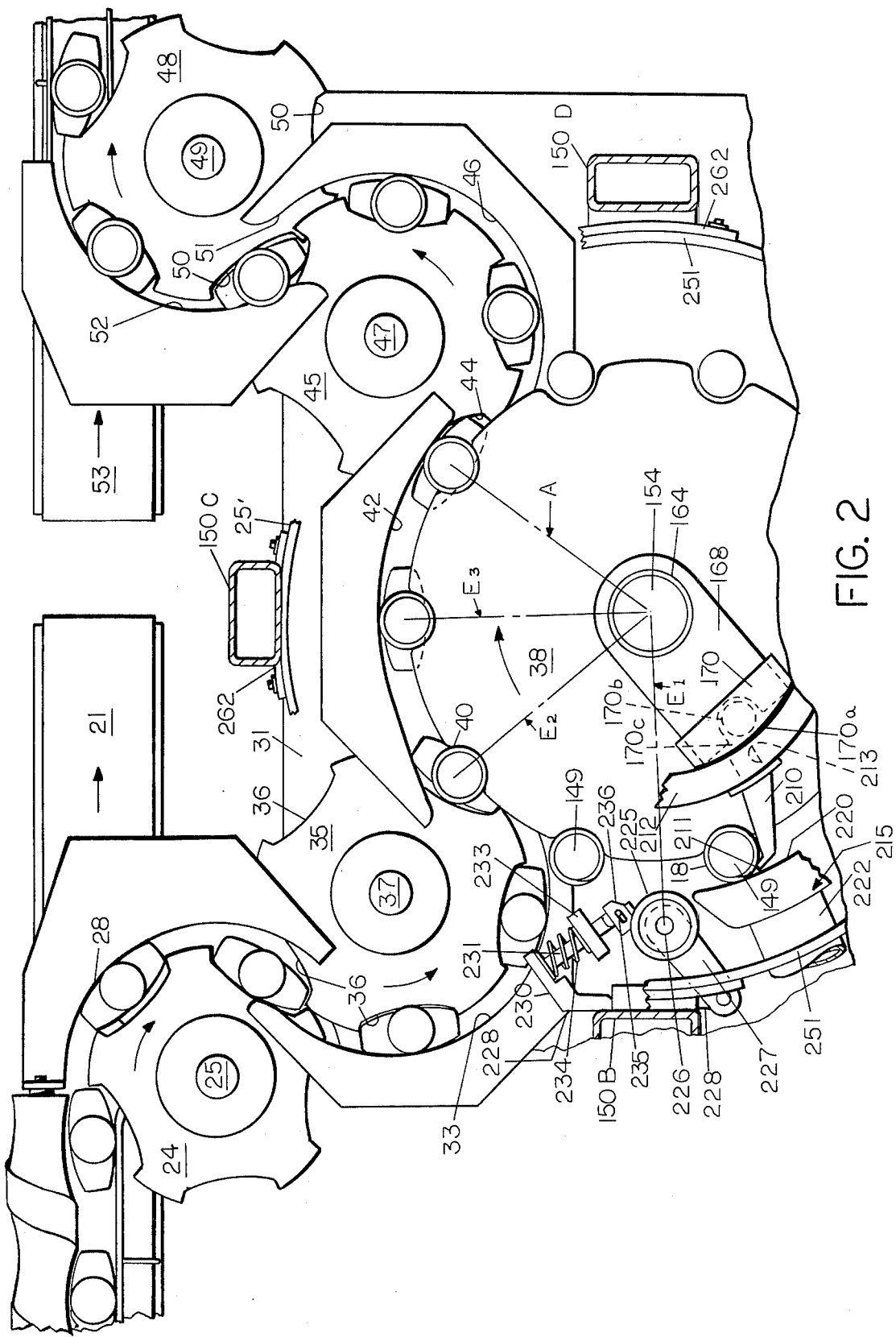
FIG. 2 is a partial top plan view of a portion of the machine with parts broken away.
Figure 3:
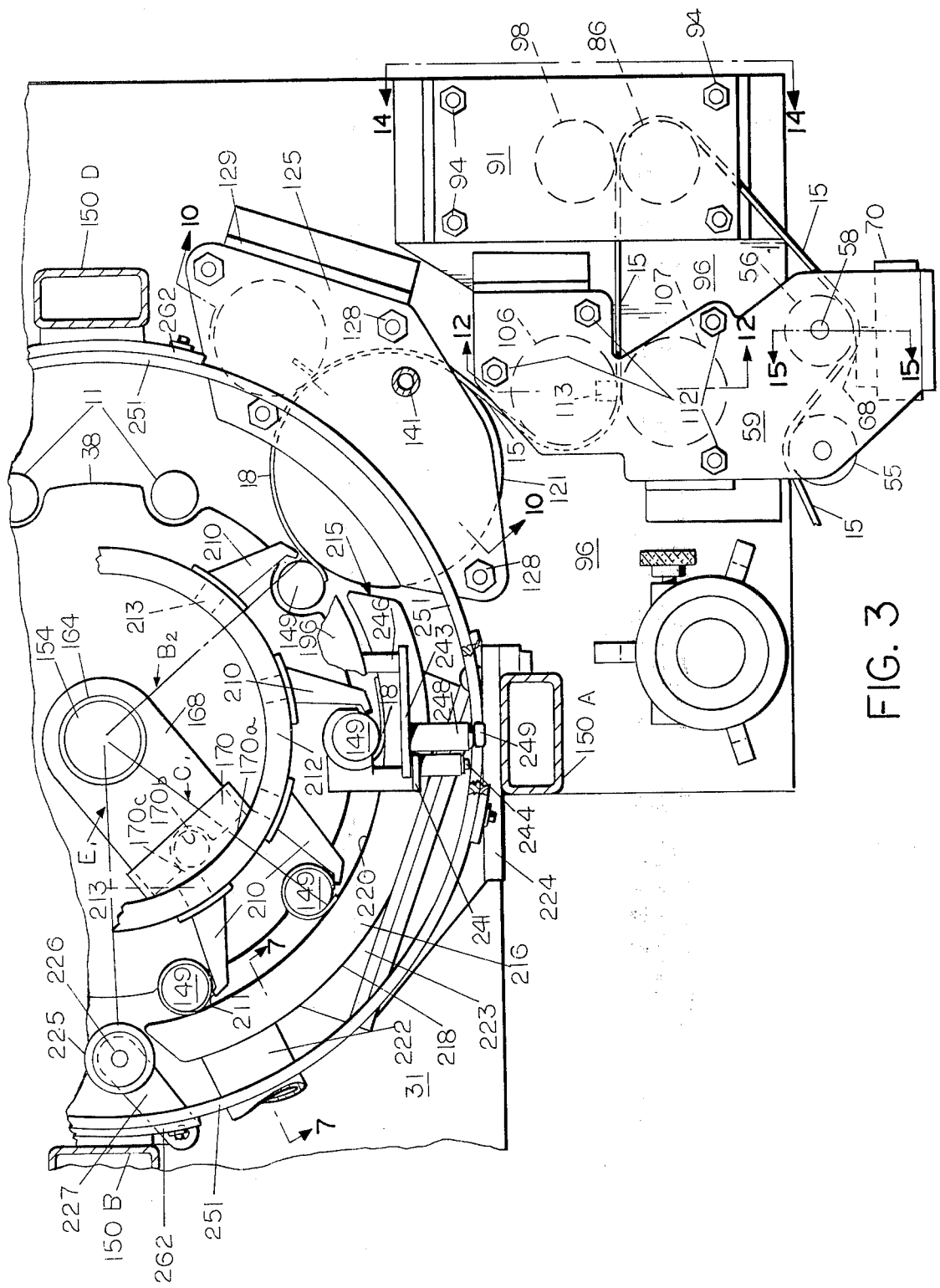
FIG. 3 is a partial top plan view of the remaining portion of the machine and is a companion view to FIG. 2.

Referring to FIGS. 1-3, from a supply of bottles 10 and supply of plastic web 15, the plastic labels are formed and assembled on the bottles as the latter pass through the machine. A bottle infeed conveyor 21 advances a line of bottles 10 into a right-hand infeed worm 22 which includes lands 23 which orient the bottles and space them at proper center-to-center distance on conveyor 21 (see FIG. 2). The right-hand worm is driven in synchronized rotation with a star wheel 24 having upper and lower stars which define peripherally-spaced bottle pockets 26 contoured to receive bottles 10 in the proper orientation. The stars are fastened on a vertical shaft 25 driven clockwise (FIG. 2) and timed with worm 22 by suitable interconnecting drive means (not shown). Bottles 10 are received between lands 23 of worm 22 and held in a line by side guide rail 27 which terminates adjacent star 24. As seen on FIG. 2, bottle 10 is moved into a pocket 26 on star 24 just as it leaves rail 27 and advances with conveyor 21 into engagement with the arcuate guide plate 28 supported on vertical posts 29 and 30 attached to the deck plate 31 of the machine frame. Plate 28 transfers bottle 10 from conveyor 21 with star pocket 26, over a dead plate 32 and into engagement with a second arcuate guide plate 33 fastened on post 34 anchored on the machine deck 31. Guide plate 33 includes upper and lower arcuate members whose curvature is in a reversing arcuate direction from the curvature of guide plate 28. Thusly, as guide 33 engages bottle 10 it is removed from star pocket 26 and inserted into a second star wheel 35 at one of its peripheral pockets 36. Star wheel 35 is comprised of upper and lower starts fastened on vertical shaft 37 (FIG. 2) driven counter clockwise and timed with the first star wheel 24. While in a pocket 36 of star wheel 35, bottle 10 is carried along arcuate guide member 33 to a position on the periphery whereat bottle 10 is engaged by the pocketed bottle positioning wheel of the turret assembly comprised of upper and lower pocketed rotary members 38 and 39, respectively. (See also FIG. 4). The upper member 38 has arcuate neck pockets 40 spaced about its periphery at equal intervals for engaging bottle 10 at its lower neck region. Lower member 39 has arcuate, shaped body pockets 41 spaced about its periphery on a common center axis with a corresponding neck pocket 40 to receive and engage the body of a bottle 10. The mandrels of the turret assembly, to be presently described, are co-axial with their respective pockets 40, 41 of the bottle positioning wheel 38, 39. The upper and lower rotary members 38, 39 are interleaved with the peripheral region of the second upper and lower stars 35 in a somewhat meshing, overlapping relationship. A bottle 10 in pocket 36 will be guided into the neck and body pockets 40 and 41 in this overlapping region of the two and carried to engagement with a third arcuate guide member 42 mounted on the frame opposite positioning wheel members 38, 39 and interposed vertically therebetween for engaging the bottle along its body wall surface opposite pocket 41 of the bottle positioning wheel. The wheel members 38, 39 are rotated in a clockwise direction about the vertical axis of shaft 43. During bottle movement along the arcuately curved guide surface 42 of said guide member by the bottle positioning wheel, the neck and closure vertical axis of bottle 10 is maintained in alignment with the vertical axis of the mandrels on the overhead turret. Such span of movement defines the label transfer station for assembling the sleeve label telescopically over the neck and cap skirt of bottle 10 in a manner more particularly hereinafter described. The bottle neck and cap, having received a label sleeve element 18 thereon during movement along arcuate guide 42 (label transfer station), bottle 10 is thereafter introduced into one of the pockets 44 on the third star wheel means 45 comprised of upper and lower stars which mesh with the pockets of the positioning wheel members 38, 39. The upper and lower stars of wheel means 45 are fastened on a vertical shaft 47, which is driven counter clockwise (FIG. 2) in timed relation to wheels 38, 39. A reversing curvature guide member 46 is fastened on vertical posts (not shown) anchored on the frame deck 31 and defines an arcuate reversing path for removal of bottle 10 from pocket 40, 41 and inserting bottle 10 into a pocket 44. A fourth star wheel means 48 is fastened on vertical shaft 49 and has peripheral pockets 50 for receiving bottle 10 as it moves along the terminal end 51 of guide surface 46. Fourth star wheel 48 is driven in a clockwise direction and carries the bottle 10 along the arcuate path and onto an exit conveyor 53. The shaft 49 is timed from shaft 47 to provide a meshing relationship of the pockets 44 and 50 of the third and fourth star wheel means, respectively. There is a stationary horizontal bottom dead plate 32 of nylon or suitable plastic of low friction material (FIG. 4) supported on the machine deck 31. The dead plate member 32 extends over the reversing path of bottles 10 through the inlet and exit star wheels and the intermediately located bottle positioning wheel. The bottles traveling in this path slide over the bottom dead plate 32 for support while propelled by the pocketed wheels 24, 35, 38, 45 and 48, respectively (FIGS. 2 and 3).

Exit conveyor 53 carries the serial file of bottles 10 with neck labels 18 in position thereon for shrinking into a heating device 54, represented somewhat schematically by the tunnel structure on FIG. 1. Conveyor 53 traverses the length of the heating devices 54 wherein heat may be supplied by various known devices. One form of heater that may be used is an elongated bank of infrared heating unit. For best distribution of heat, the bottles may be rotated during travel through the tunnel by use of known conveyor devices providing such rotation.

Figure 28:
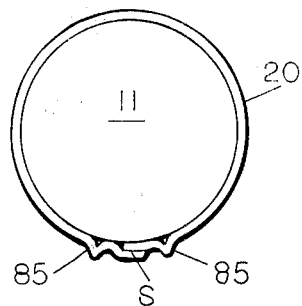
FIG. 28 is a top plan view of a label shrunken onto a cold bottle under the present invention.

Another form of heating device suitable for use in the invention is circulated hot air. In this form, the bottles may be conveyed longitudinally of the device 54 without rotation, the heat being supplied by transversely circulated hot air aimed at the label region, and oriented by louvers or baffling in the air circulation system of the heater so as to concentrate the hot air at the total label area or apply a differential of the heat to concentrate heat more heavily on the seam area, e.g. the embodiment of FIGS. 28 and 29. The air temperature may vary depending upon the composition of the polymeric material, its thickness in the label and the time available in the tunnel to complete the shrinking of the label sleeve onto the bottle neck and cap. The variables in the heating device will be adjusted to the nature of the product in the bottle so that the product will not be detrimentally affected.

The conveyor 53 next transfers the finished, labelled bottles, such as shown on FIG. 29, to a location and means for packaging, casing and shipment or storage.

WEB SLITTING DEVICE

Referring to FIGS. 1, 3 and 15–17, the flexible web 15 is furnished from a supply roll (not shown) in an on-edge, vertical attitude and is reeved over freely rotatable idler roll 55 and onto a back-up roll 56 of the web slitting device. Roll 56 is a cylinder that is rotatable on vertical shaft 57. Shaft 57 is supported at its opposite ends in an upper aperture 58 in horizontal top plate 59 of the assembly and in a vertically aligned aperture 60 in horizontal bottom plate 61. Top plate 59 and bottom 61 are rigidly connected by the vertical end plate 62 fastened to each by the cap screws 63. Shaft 57 has end bearing sleeves 64 pressed thereon and sleeve 56 is rotatable about shaft 57 on ball bearings 65 in the races 66 fastened at the ends of the roll cylinder 56.

The roll cylinder 56 includes the annular rectangular-like groove 67 at the preselected elevation thereon to cooperate with knife blade 68 of the device. Knife blade 68 is fastened on a T-block holder 69 by screw means 73. Holder 69 slides in the horizontal C-block 70 having elongated guide surfaces 71 and 72 at the open end of the C configuration. End plates 74 and 75, respectively, have adjusting screws 76 and 77 threaded therein in alignment with each other, and the inner ends of screws 76, 77 bear against the opposite end faces of block holder 69 carrying knife blade 68. By counter rotating screws 76, 77, blade 68 may be shifted toward or away from groove 67 on the cylinder roll. The position of blade 68 is set by locking nuts 78 threaded on each of the end adjusting screws 76, 77. The blade holder block 69 is held forward against guide surfaces 71 and 72 of C-block 70 by the pair of compressed springs 79 retained in recesses on the back side of C-block 70. Accordingly, knife blade 68 is yieldably mounted in the assembly and is flexible in the outward direction. Should an obstruction, other than the web material, engage the knife blade in operation, it may yield away from roller 56. The C-block 70 holding the knife assembly is adjustable vertically on the attachment to vertical end plate 62 by bolts 81 in the elongated slots 82 and blade 68 is thusly positioned vertically to align horizontally with groove 67 of the cylinder roll.

In accordance with the invention, the knife 68 imparts a score line 84 weakening the material of web 15 at that line extending in the running direction of the web. The score line 84 is shown on FIG. 22 in an enlargement and is characterized as a partial-depth slit in the plastic material from which the label blank 18 (FIG. 21) is made. The score line 84 extends lengthwise of the blank 18 and parallel to the longitudinal side 17 of the blank. The web stock 15 is scored on the surface opposite decoration 16 (FIGS. 1 and 29), whereby the score line 84 will be on the surface of the label next to the bottle and will not be readily visible in the label until the cap is turned and the label severed along the line of weakening at the slit 84.

WEB PLEATING DEVICE

Figure 21:
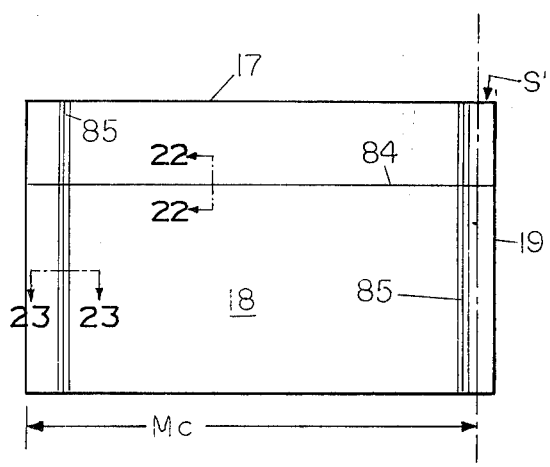
FIG. 21 is a bottom plan view of a label blank that is scored and pleated.

Another important assembly on the machine is the means for providing plural pleats across the web so that two or more such pleats appear in each of the label blanks. Referring first to FIGS. 21 and 23, the pleats 85 are represented as a crush or v-fold of the material as shown on the representative cross-section of a pleat on FIG. 23. The pleats 85 appear across the width direction of the label blank 18 and are generally, as shown on FIG. 21, parallel to the width dimension, (edge 19), of blank 18. However, the pleats need not parallel edge 19.

Figure 13:
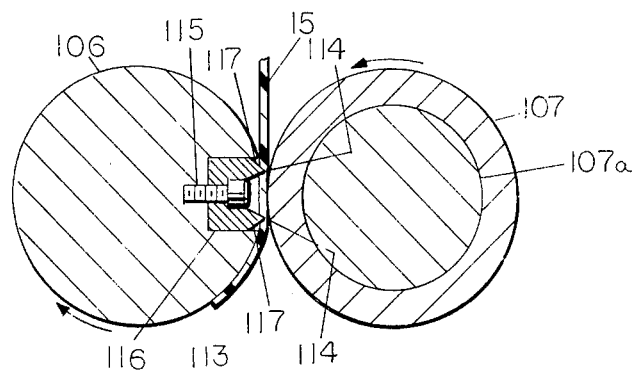
FIG. 13 is a sectional plan view taken along line 13—13 on FIG. 12.
Figure 14:
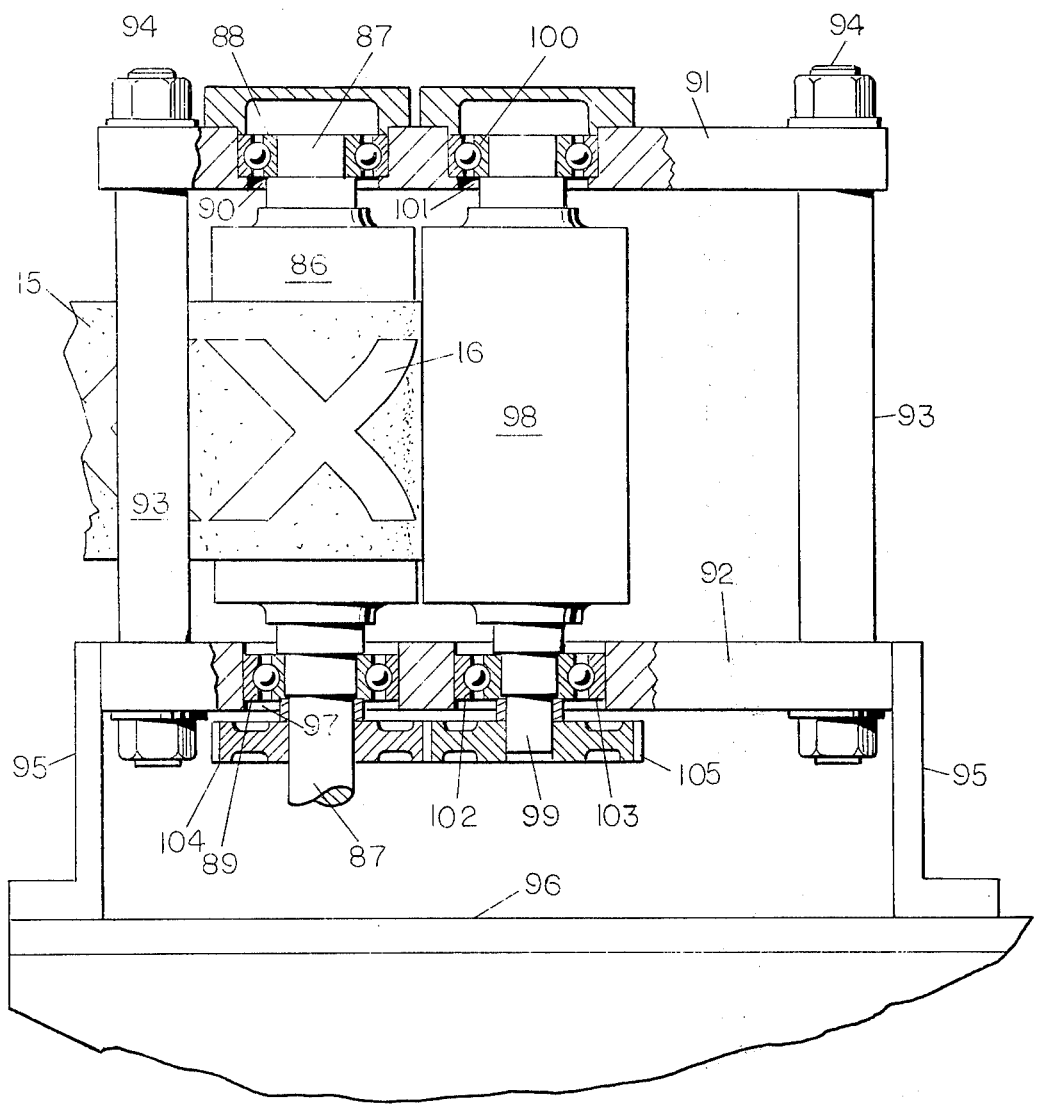
FIG. 14 is an elevational view, partly in section, taken along line 14—14 on FIG. 3.

Referring to FIGS. 1, 3, and 12–14, the web 15 is fed from the slitting device over a pull roll 86 that is driven forward (counter clockwise on FIG. 3) for pulling web 15 through the slitting knife 68 and roller 56, just described. Pull roll 86 is fastened onto a vertical shaft 87 mounted in ball bearings 88 and 89 at the opposite axial ends of pull roll 86 (FIG. 14). Bearing 88 is retained in a seat aperture 90 in the top plate 91 of the roller assembly. Top plate 91 is spaced from the bottom plate 92 by four hollow tube supports 93 and bolts 94 extend through each of the supports 93 to fasten the two plates 91, 92 together. Bottom plate 92 is welded to angle brackets 95 which are welded onto the top side of the elevated deck 96 of the machine frame. The lower ball bearing 89 is retained by a seat aperture 97 in bottom plate 92 and in vertical axial alignment with top aperture 90. Pull roll 86 operates in conjunction with a second roll 98 mounted on vertical shaft 99 which has a top ball bearing 100 retained in an aperture seat 101 in top plate 91, and a bottom ball bearing 102 retained in a correspondingly vertically aligned aperture seat 103 in bottom plate 92. The two vertical shafts 87, 99 are driven in opposite directions of rotation through the drive gear 104 fastened on shaft 99. Shaft 87 is connected to the power train, to be described later herein.

Figure 12:
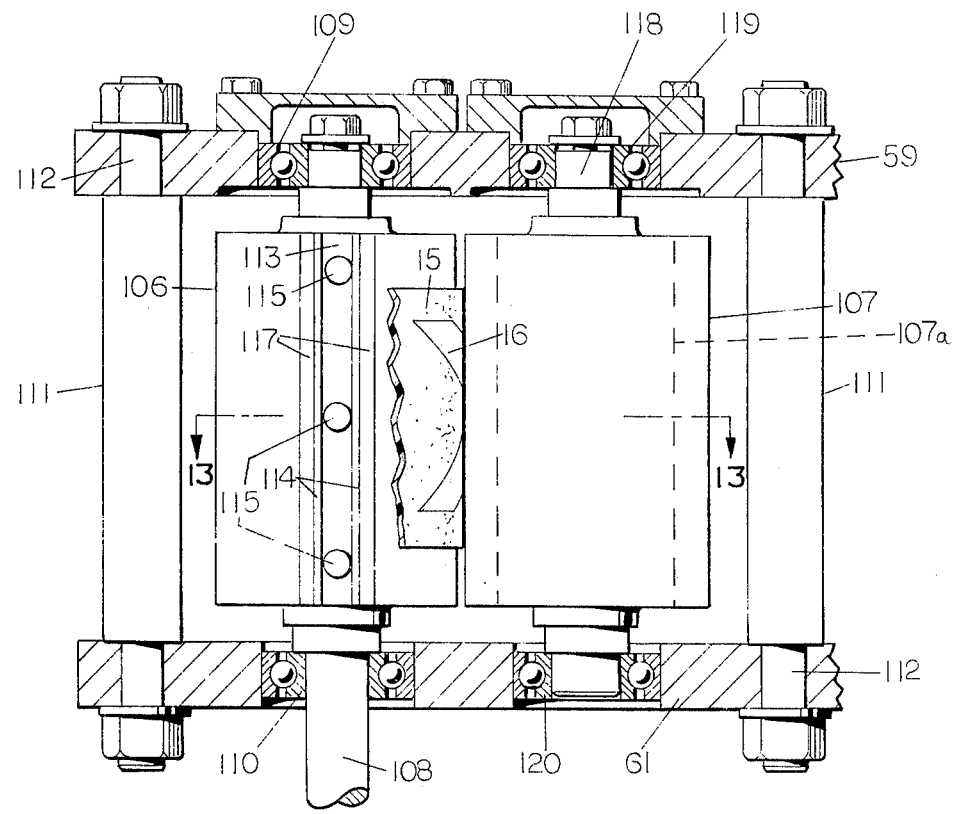
FIG. 12 is a sectional elevational view taken along line 12—12 on FIG. 3.

From rolls 86, 98, the web 15 enters between pleating roll 106 and back-up roll 107 (FIGS. 12 and 13). Pleating roll 106 is fastened on vertical shaft 108 rotatably mounted in bearings 109 and 110 in aligned seat apertures in the top plate 59 and bottom plate 61, respectively, which is also the frame connecting means for the web slitting device, earlier described herein. The plates 59 and 61 are rigidly connected by hollow cylinder columns 111 each having a bolt 112 through the column and the plates 59, 61. A pleating tool 113 is fastened in place on the face of the pleating roller at a peripherally axially extending slot 116 formed on the cylindrical surface of roller 106 by the several screws 115. Pleating tool 113, in one embodiment of the invention, comprises an elongated U-shaped insert element having outwardly directed, spaced-apart tips 114. The extent to which tips 114 project radially outwardly from the cylindrical surface of roll 106 will determine the depth and contour of the pleats 85 to be formed in the web of the material 15. Pleats 85 are formed from the side of the web opposite the side on which decoration 16 is printed. As may be seen on FIGS. 12 and 13, there is a relief cut at 117 on the outer edge of tips 114 along the cylindrical surface of roll 106 to accomodate the compressed web material in forming the pleats. Similarly, between tips 114 and along the tool there is a relief or recess area into which pleated plastic of the web may deform in the pleating operation.

Back-up roll 107 is formed of a steel cylindrical core 107a covered with a uniform depth layer of rubber 107 or like yieldable material. Roll 107 is attached on vertical shaft 118 that is mounted by ball bearing 119 in top plate 59 and ball bearing 120 in bottom plate 61 of the frame structure. Roll 107 is freely rotatable and is driven by nip engagement with the surface of the web 15 travelling between rolls 106 and 107. The circumference of pleating roll 106 is equal to the length dimension 17 of a label blank 18. In the example on the drawings (FIGS. 12, 13, 21 and 28), the label stock is cross pleated in closely spaced pairs of the pleats 85 and each blank is severed from the web approximately midway in between the pleats so that a pleat 85 appears near the leading edge and the trailing edge of the blank 18. (See FIG. 21). After the leading and trailing ends of the blank are overlapped and seamed to a hollow sleeve form, the pleats 85 are located somewhat in the fashion represented on FIGS. 28 and 29. This represents the preferred embodiment of the invention.

Figure 31:
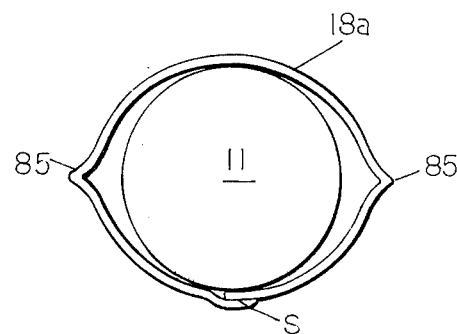
FIG. 31 is a top plan view of a bottle illustrating a second embodiment of the form of label utilized in the invention, the label appearing thereon before it is shrunken by heating.
Figure 32:
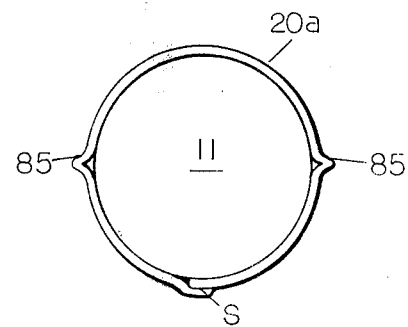
FIG. 32 is a top plan view of the bottle of FIG. 31 after the label is shrunken thereon.

By revising the configuration of pleating roll 106, a second embodiment of the invention is practical. This is shown in result on FIGS. 31 and 32, whereat pleats 85 are approximately diametrically disposed on the sleeve (FIG. 31) and when shrunken on the bottle neck and cap (FIG. 32) appear on diametrically opposite sides of the bottle. To achieve this second embodiment, two single tipped pleating tools are fastened on the periphery of the pleating roll 106 at a greater circumferential spacing. Since the circumference of the roll 106 is approximately equal to a cut label blank length, location of the pleating tools or tips on the roll surface and spacing between tips, as well as number of tips used, provides for a wide variation in the array of multiple pleats that may be formed in the label stock from which label blanks are to be formed.

LABLE BLANK FEED DRUM

After the scored and pleated web 15 leaves roller 106, it is fed over a feed drum 121 which controls the web while label blank lengths, such as label blank 18 (FIG. 21), are cut in succession.

Figure 11:
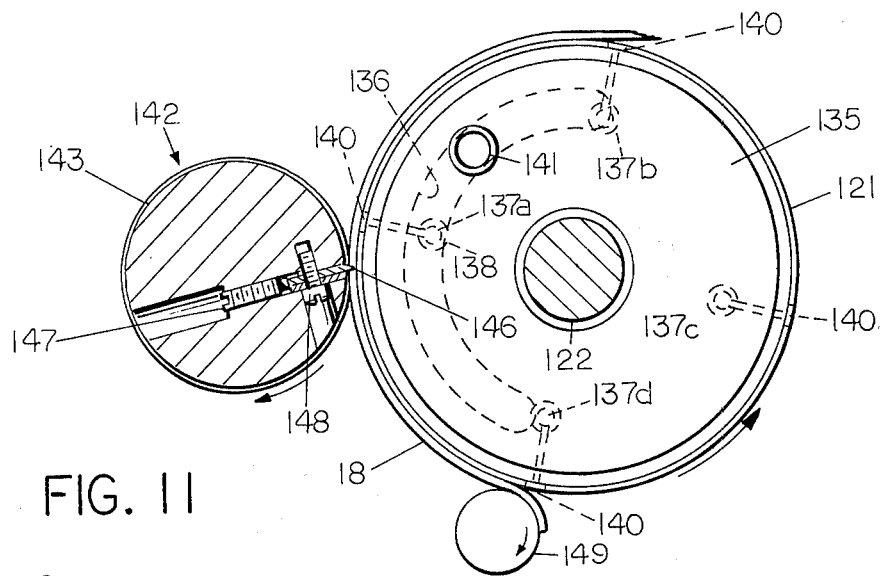
FIG. 11 is a sectional plan view taken along line 11—11 on FIG. 10.
Figure 10:
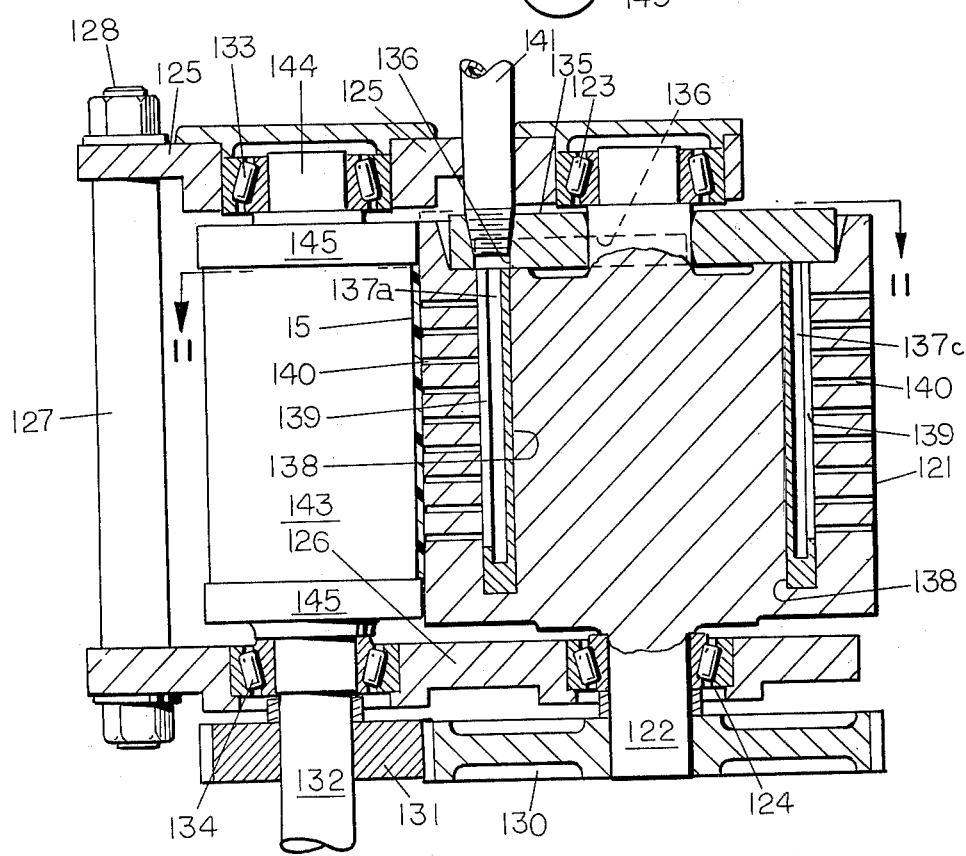
FIG. 10 is a sectional elevational view taken along line 10—10 on FIG. 3.

Referring to FIGS. 3, 10 and 11, feed drum 121 is fastened onto shaft 122 and rotatably mounted by roller bearings 123 and 124. The feed drum is supported in a separaate frame from the slitting and pleating devices. The support for the feed drum is comprised of the top member 125 and a spaced lower member 126 held together by hollow cylindrical standards 127 and bolts 128 extending through members 125, 126 and standard 127. The lower member 126 is fastened to vertical brackets 129 (FIG. 3), which are bolted to the deck 31 of the machine frame. The vertical leg of brackets 129 places feed drum 121 at the proper elevation with respect to the mandrel turret. Feed drum 121 is rotated by driving shaft 122 through gear 130 on its lower end in mesh with drive gear 131 on the lower stub shaft 132. Shaft 132 is parallel with shaft 122 which is mounted on roller bearings 133 and 134 housed, respectively, in the top member 125 and lower member 126.

A vacuum manifold member 135 is fastened onto top member 125 and fixed in stationary position. Vacuum manifold 135 includes an arcuate manifold chamber 136 machined as an open arcuate slot along the bottom face of the manifold for selective connection with the four vertical passages, 137a–137d (FIG. 11) in drum 121 disposed radially inwardly from the drum surfaces. The passages are each formed by a tube insert 138 placed in a vertical bore parallel to the axis of the drum and provided with a longitudinal slot 139 facing a series of radial vacuum ports 140 drilled radially inwardly from the face of drum 121. The passages 140 connect to the manifold chamber 136 through the tube slot 139 and vertical passages 137 in response to rotation of drum 121 along the underside of manifold chamber 136. Vacuum is connected to manifold chamber 136 by pipe 141 threaded into the top inlet port of the manifold member.

Referring to FIG. 11, the vertical passages 137 are operable for connection to the vacuum manifold in pairs and are located approximately one quarter circle apart in drum 121. As web 15 is approximately at a tangent point with the face of drum 121, the vertical passage (137b on FIG. 11) moves into a connection with the forward end of manifold chamber 136, which applies a vacuum at the vertical row of ports 140 on the face of the drum holding the web onto the drum. Through the transmission gearing, hereinafter described, and circumference of drum face 121, the peripheral speed of drum face 121 exceeds the speed of web 15 as the latter is advancing from the pleating roll. As the ports 140 at 137b advance toward the position shown for 137a, the drum face 121 slips on the web and the vacuum applied pulls web 15 taut to the rotary cutter. After a cut is made by cutter 142, the cut piece travels with drum face 121 and separates the trailing end of the label blank from the leading end of web 15.

Rotary cutter 142 is comprised of a cylinder 143 fastened on lower stub shaft 132 and an upper stub shaft 144, each stub shaft having end caps 145 holding the cutter cylinder 143 for rotation of the cutter on the common central axis of stub shafts 144 and 132. Cylinder 143 includes a vertical knife blade 146 in a milled vertical slot in the cylinder. Blade 146 is backed by screws 147 and held in the cylinder by screws 148 through slots in the knife blade 146. The tip of blade 146 projects beyond the face of cylinder 143 a distance approximately the thickness of the material of web 15 and, in its vertical length, knife 146 is the same as or greater than the width of web 15. As may be seen on FIG. 11, for each revolution of cylinder 143, knife 146 cuts a length of the web to form a label blank 18. After the transverse cut is made by knife 146, the vacuum ports 140 continue to pull the web and as the forward ports, such as shown opposite 137a, passes the line of cut, the second vacuum ports, opposite 137b, are pulling on the web. At such time as the vacuum ports are opposite the position shown at 137d, the knife has again revolved into a cutting position and the forward end of the web, now the leading end of a label blank 18, is engaged onto the cylinder surface of a mandrel 149. As this end of the blank engages the mandrel surface, vacuum ports 140 opposite the passage 137d are disconnected from the vacuum in chamber 136. Label blank 18 is now under control of mandrel 149, as will be presently described.

The feed drum 121 and rotary cutter 142 are driven synchronously through the intermeshing gears 130 and 131.

MANDREL TURRET

Referring to FIGS. 1, 3, 4, 6, 9, 19 and 20, the mandrel turret is supported on four vertical frame members 150A-D supporting an X-shaped top plate 151. On the underside of top plate 151, a circular vacuum manifold 152 is fastened in stationary position on a box spacer 153. A vertical turret shaft 154 is supported in end bearing 155 mounted in plate 151 and extends through a center opening in box spacer 153 and manifold 152. The lower end of shaft 154 is supported in bearing 156 held in frame deck 31. A bull gear 157 is drivably fastened onto the lower end of shaft 154 below deck 31, and gear 157 is in mesh with a drive gear 158 on the power output shaft 159 of drive transmission 160. Power input shaft 161 of transmission 160 is driven by chain drive 162 from a main electric drive motor 163.

Intermediate the end bearings, shaft 154 has an elongated vertical rotatable tube 164 connected to the shaft and rotating in bushings 165 and 166. A cylindrical journal 167 supports the bushings and includes a lateral arm 168 bolted onto the vertical leg of the L-bracket 169 welded onto deck 31. This provides a stationary support on the frame for the air heater manifold 170, later described herein. Spider hub 171 is welded at the top end of tube 164, and circular spider 172 is bolted onto hub 171. The several mandrel unit assemblies are supported in a circular arrangement on spider 172.

THE MANDREL ASSEMBLY

Figure 4:
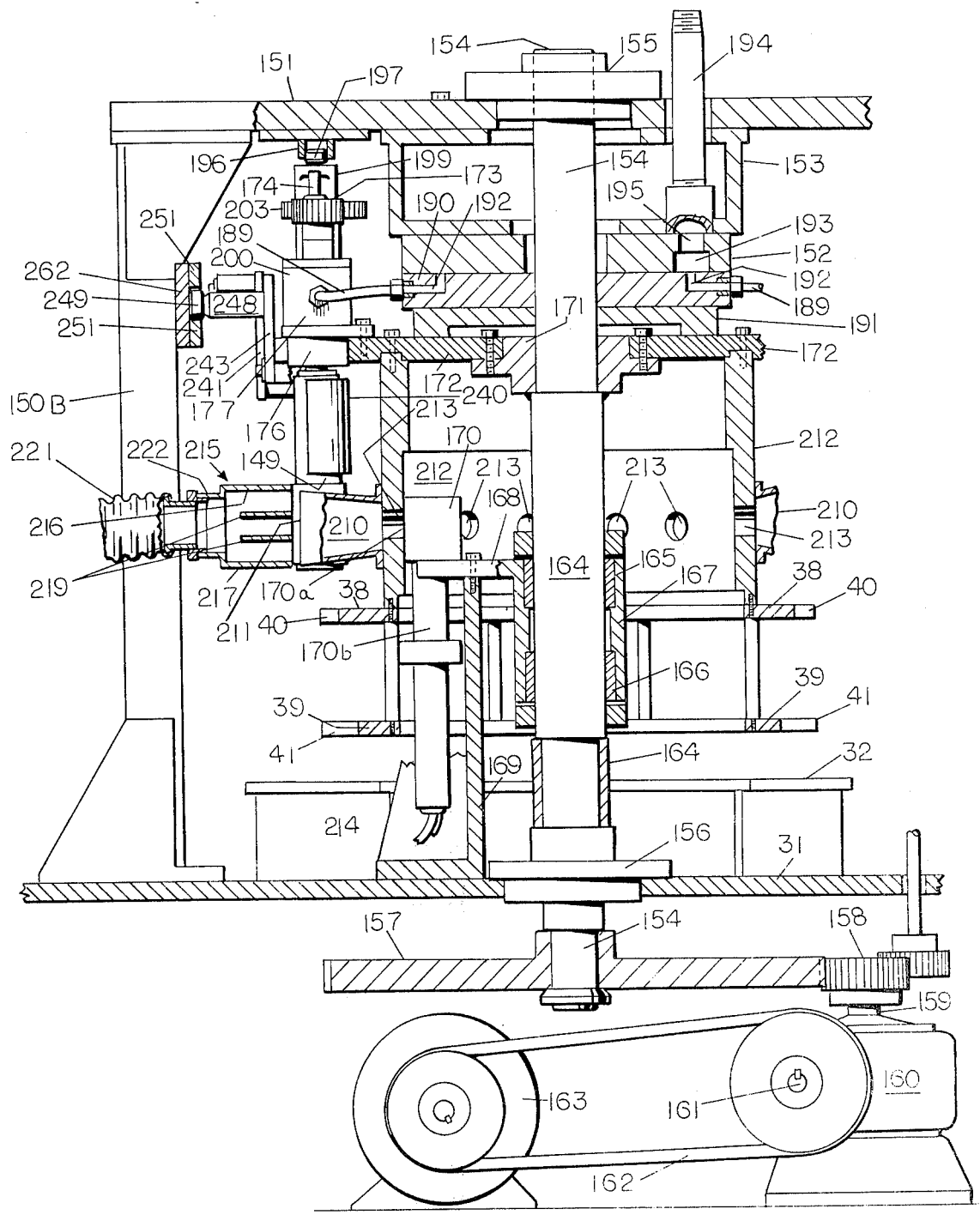
FIG. 4 is a sectional elevational view of the machine.
Figure 9:
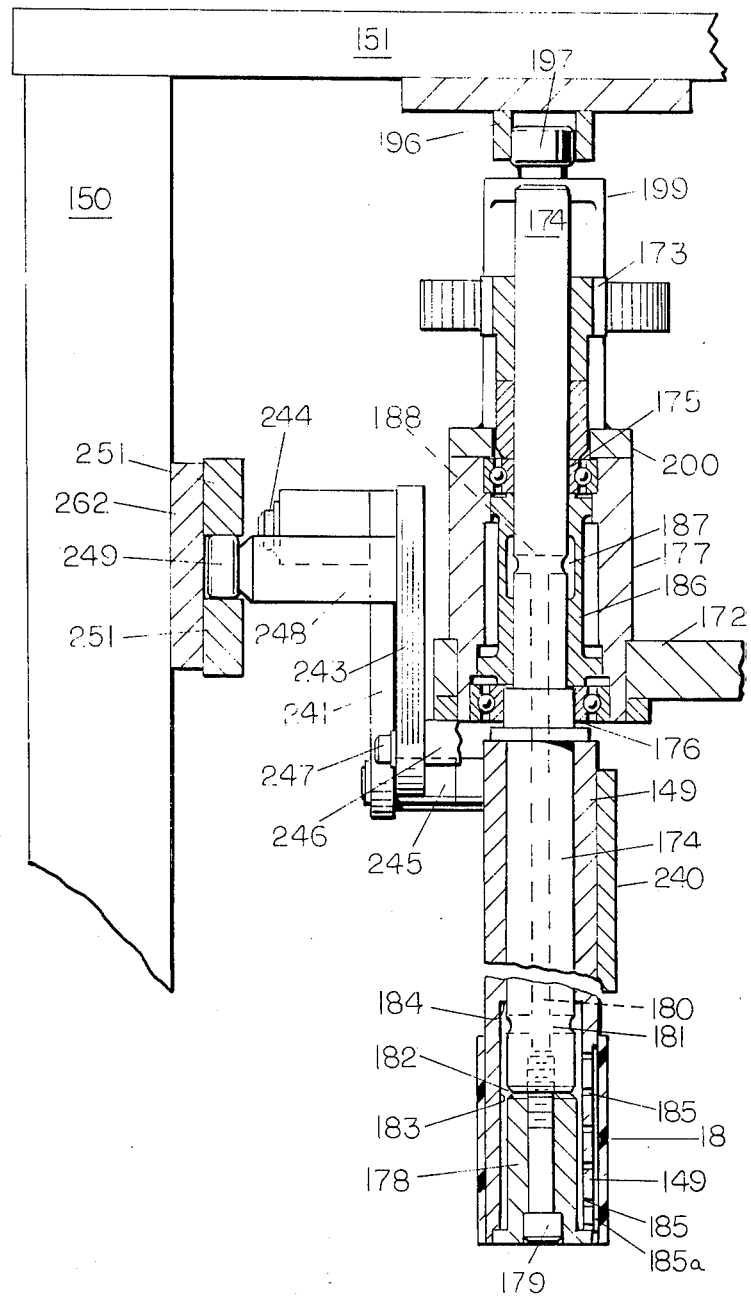
FIG. 9 is a sectional elevational view of mandrel mechanism of the machine.
Figure 19:
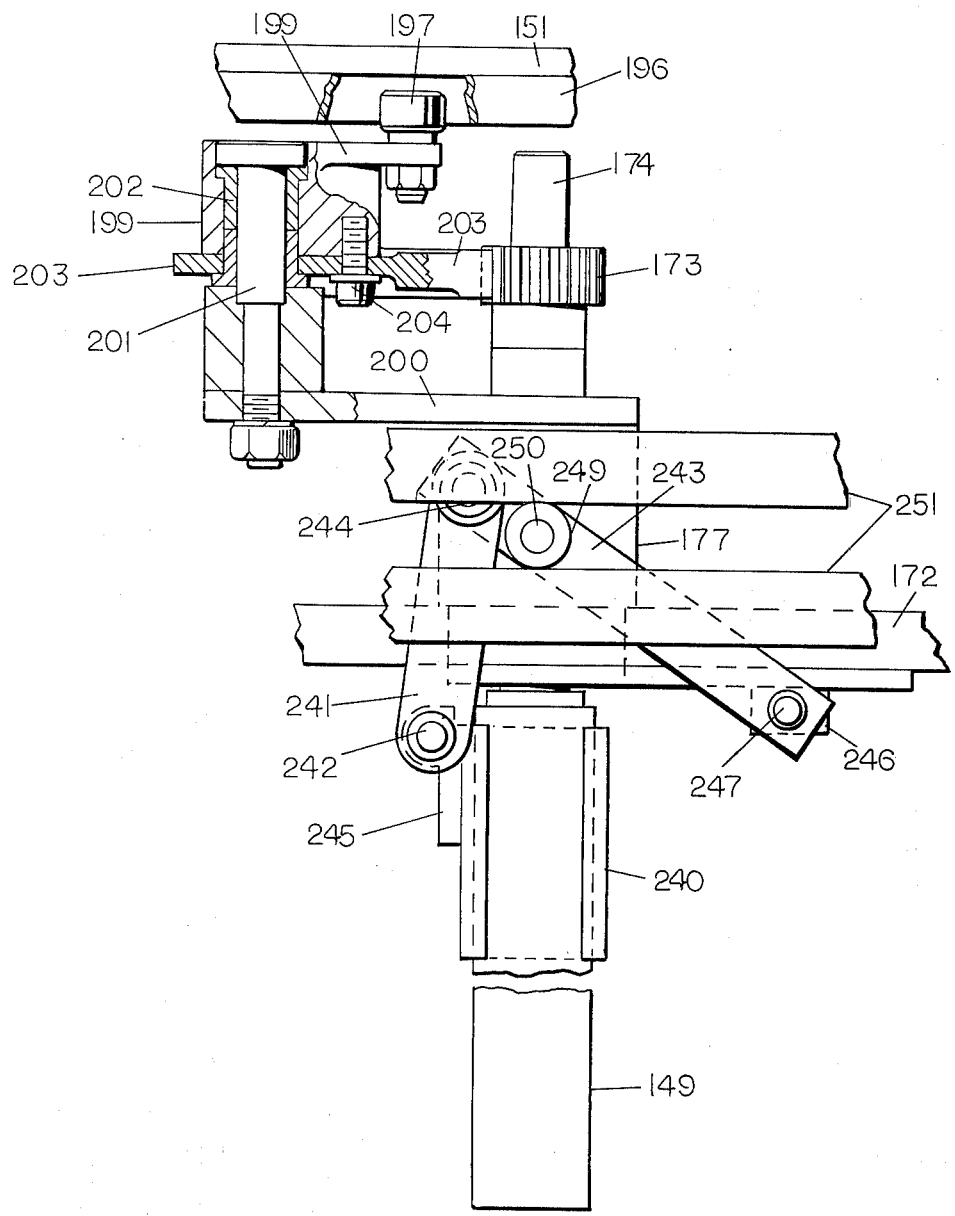
FIG. 19 is a side elevational view, partly in section, of the drive means for rotating the mandrel.

Each of the mandrel assemblies is constructed similarly (FIGS. 4, 9 and 19). A pinion gear 173 is keyed onto a spindle shaft 174 which is rotatable on ball bearings 175 and 176 retained by the journal box 177 on spider 172. Mandrel cylinder 149 is fastened over the lower end of shaft 174 and retained by the end hub seal 178 and bolt 179 threaded in the central passage 180 of shaft 174, the bolt 179 sealing passage 180 at the lower end of the spindle. Passage 180 connects to the annular slots 181 on the periphery of spindle shaft 174 into an annular chamber 182 formed by the enlargement of the bored wall 183 on the lower end of mandrel extending from the internal annular shoulder 184 to the internal end wall of hub seal 178. Plural axial parallel slots 185a are cut along the peripheral surface of the mandrel wall (FIGS. 9 and 18). Radial ports 185 are disposed along an axial line in the wall of mandrel 149, and each connects with the several slots 185a (FIG. 18). The slots 185a are milled in the wall of mandrel 149 to provide the plural, thin, elongated, grid-like openings through which the vacuum is pulled against the surface of the label blank that is being wound on the mandrel wall. Vacuum applied by the structure just described is preferred because of the advantages of increased holding force on the blank 18 and surface deformation of the material in the blank is virtually eliminated.

In upper journal box 177, an annular seal sleeve 186 is mounted on shaft 174 in stationary position and is retained between the bearings 175, 176. Sleeve 186 includes an annular interior groove 187 providing a passage connection to the central passage 180 of the shaft through the lateral leg 188 bored in the shaft. Vacuum is connected to annular groove 187 by hose 189 (FIG. 4), which extends to the rotor plate 190 of the vacuum manifold 152. Rotor plate 190 is mounted onto the spider 172 by lower annular member 191 welded thereto. Each hose 189 is connected onto the right angle port 192 which opens onto the lower facing of stationary manifold 152 in alignment with the arcuate manifold channel 193 formed therein with an open side facing down against the top surface of rotor 190. The vacuum is connected into channel 193 from a source piped to the machine at conduit 194 connected to vertical port 195 in manifold 152. The arcuate extent of channel 193 is shown on FIG. 6 and extends in the rotary path of the turret spanning the winding cycle of the label blanks about the mandrel.

The winding cycle of each of mandrels 149 is controlled by an endless positive, two-sided cam 196 fastened on the underside of top plate 151 of the turret frame. Cam follower 197 runs in the track of cam 196 and is rotatably connected on crank arm 198 of the bell-crank 199. The cantilevered arm 200 is attached on the top side of the journal box 177 (FIG. 19). Pivot shaft 201 is assembled in the bushing 202 for pivotally mounting the gear segment 203 with bell crank 199. Gear 203 is fastened to the hub of bell-crank 199 by cap screw 204. The teeth of gear segment 203 are in mesh with the teeth of pinion 173 on spindle shaft 174.

BLANK WINDING CONTROL GUIDE

At the label transfer station whereat the label blank 18 is transferred from the feed drum onto the surface of the mandrel, the leading end of the blank being held by vacuum at the mandrel ports 185a, the rectilinear strip of material (the blank) is wound by the mandrel as it travels forward away from the feed drum. During this winding, the free trailing portion (tail) of the blank is guided and controlled by winding guide device 215. Referring to FIGS. 1, 3, 4 and 7, device 215 preferably comprises a hollow box chamber comprised of top wall 216, bottom wall 217 and a curved rear side wall 218. The front face of the device is arcuate and corresponds to the arc of the circular path the mandrels describe in travel past guide 215. The front of device 215 is perforated, or as shown, comprises plural, parallel, horizontally disposed and vertically spaced plates or slats 219 providing on their outer edges 220 a guide surface for engaging the radially outwardly facing surface of a blank 18 as the mandrel carries it along this surface. Slats 219 are welded to the side wall 218 near the opposite ends of the chamber. A conduit 221 is connected to side wall 218 at stub pipe 222 therein. Conduit 221 is connected to a source of negative pressure (not shown); for example, an exhaust fan for moving air in the direction of the arrows on FIGS. 4 and 7.

The box chamber is mounted at the proper elevation on the machine for engaging the blanks on the mandrels by arcuate bracket 223 bolted at a flat angle plate 224 onto vertical column 150A of the machine frame. Referring to FIG. 3, it may be seen that during travel of a mandrel 149 from a tangent relationship with feed drum 121 toward the near end of device 215, the cut blank 18 is drawn from the face of drum 121. As the mandrel is opposite the guide face 220 of the guide, the free tail portion of the blank not yet wound on the mandrel surface is drawn against guide face 220 by the outward flow of air (suction) in the chamber of guide device 215. During the remaining travel of the mandrel along the arcuate guide face 220, any portion of the blank not on the mandrel is held in flat position against the face 220. As may be seen on FIG. 3, the latter two mandrels along the aft portion of the guide surface have the trailing end portion of the blank held on the guide face 220 as the leading end of the blank approaches an overlapping position at the guide face 220 by the winding rotation of the mandrel. This creates for a limited period a gap in the overlapping ends of the blank between the inside surface of the trailing end and the outside surface of the leading end thereof. Heat is applied by the hot air nozzle tip 211 directed along the height of the blank. When the two surfaces approach the melting point of the material, the mandrel completes the winding of the overlapped ends into surface engagement with one another and the overlap is now approximately on the guide face 220 (see last mandrel 149 at the position opposite stub pipe 222 on FIG. 3).

SLEEVE SEAM HEATING DEVICE

On FIGS. 1-4 and 18 a heater means is illustrated comprising a hollow, angled heat nozzle 210 terminating in an elongated narrow band slot 211 at the tip of nozzle 210. There is a heat nozzle 211 at each of the mandrel assemblies. A cylindrical hollow casing member 212 is rigidly connected to the underside of rotary spider 172 for mounting mandrels 149 (FIG. 4). Casing 212 has its central axis coaxial with center shaft 154 of the machine. Nozzles 210 are fastened in a radially depending fashion on the outer surface of casing 212 and in communication with the radial ports 213 extending through the wall of casing 212. All of the ports 213 are at the same elevation so that they come into communication with the stationary outlet head of heating element 170. As shown on FIGS. 2 and 3, heating element head 170 includes an arcuate face 170a sealingly in contact with the inner wall of casing 212. The heat is supplied to head 170 by hot air pipes 214 connected from a hot air source into the lower stem pipe 170b of the heater. Hot air exits pipe 170b at the top and is radially directed over the arcuate span of the radial manifold chamber 170c of the heating element. During rotation of the casing 212 past chamber 170c, heat via hot air is conducted through a port 213 and into the body of nozzle 210 issuing under some pressure at the narrow long band tip 211. As shown on FIGS. 2 and 3, heat is applied by tip 211 onto the interface gap of the material about to be overlapped on the mandrel 149 at the sleeve seam. The duration of heat application is established by the rotary speed of the turret and the rotary displacement duration of a port 213 in communication with the arcuate span of manifold chamber 170c on the heater head 170. The heater unit 170 is preferably operated at hot air temperature on the order of about 300°-500° F in treating a web of foamed polystyrene of about 0.015 inch thickness. Heat is applied by nozzle tip 211 as a puff of hot air under slight positive pressure for a duration of between 0.1 and 0.2 seconds. This will satisfactorily heat the overlapping end portions of the interfacing label blank wound on the mandrel for heat sealing them together and bond this material at a vertical sleeve seam S indicated on FIGS. 28-29 and 31-32. The amount of overlap is shown by the portion of longitudinal dimension S' on FIG. 21.

SEAM PRESSING ROLL

After the wrapped and joined blank is in sleeve form, the mandrel leaves the arcuate guide face 220 of the winding control device 215 and almost immediately thereafter, the mandrel passes against a press or seal roller 225 which presses the two hot overlapped surfaces (seam S) together and produces a firm seal of the material at this seam S.

Referring to FIGS. 2-4 and 8, seal roll 225 has a rubber peripheral surface and is pivotally mounted on a vertical shaft 226 extending into swing arm 227. Swing arm 227 is pivotally mounted on bracket 228 by pivot pin 229. Bracket 228 is rigidly affixed to the vertical column 150B of the machine frame. An inwardly dependent leg 230 of bracket 228 has a threaded slide rod 231 extending through leg 230 and retained by a nut 232. A circular retainer member 233 is threaded on rod 231 for adjusting the tension exerted by the coil spring 234 that is compressed against leg 230 at its one end and the face of retainer 233 at the other. The other end of rod 231 has a clip 235 connected to the swing arm 227 at the slotted projection 236.

It may be seen that seal roll 225 is positioned slightly into the orbit path of mandrels 149 and yieldable on the spring mounting just described. Mandrel 149 is oriented at the point of meshing contact between the wrapped label 18 thereon and roll 225 such that the overlapped end portions will momentarily engage the rubber surface of roller 225. As the mandrel orbits past roller 225, the pivot mounting for the latter allows arm 227 to bump slightly away from the mandrel against the yielding pressure in that direction exerted by the spring assembly 231, 233, 234. This kissing action of the roller on the overlapped blank firmly presses the seam S of the label sleeve and produces a proper seal.

MANDREL CYCLE

Figure 6:
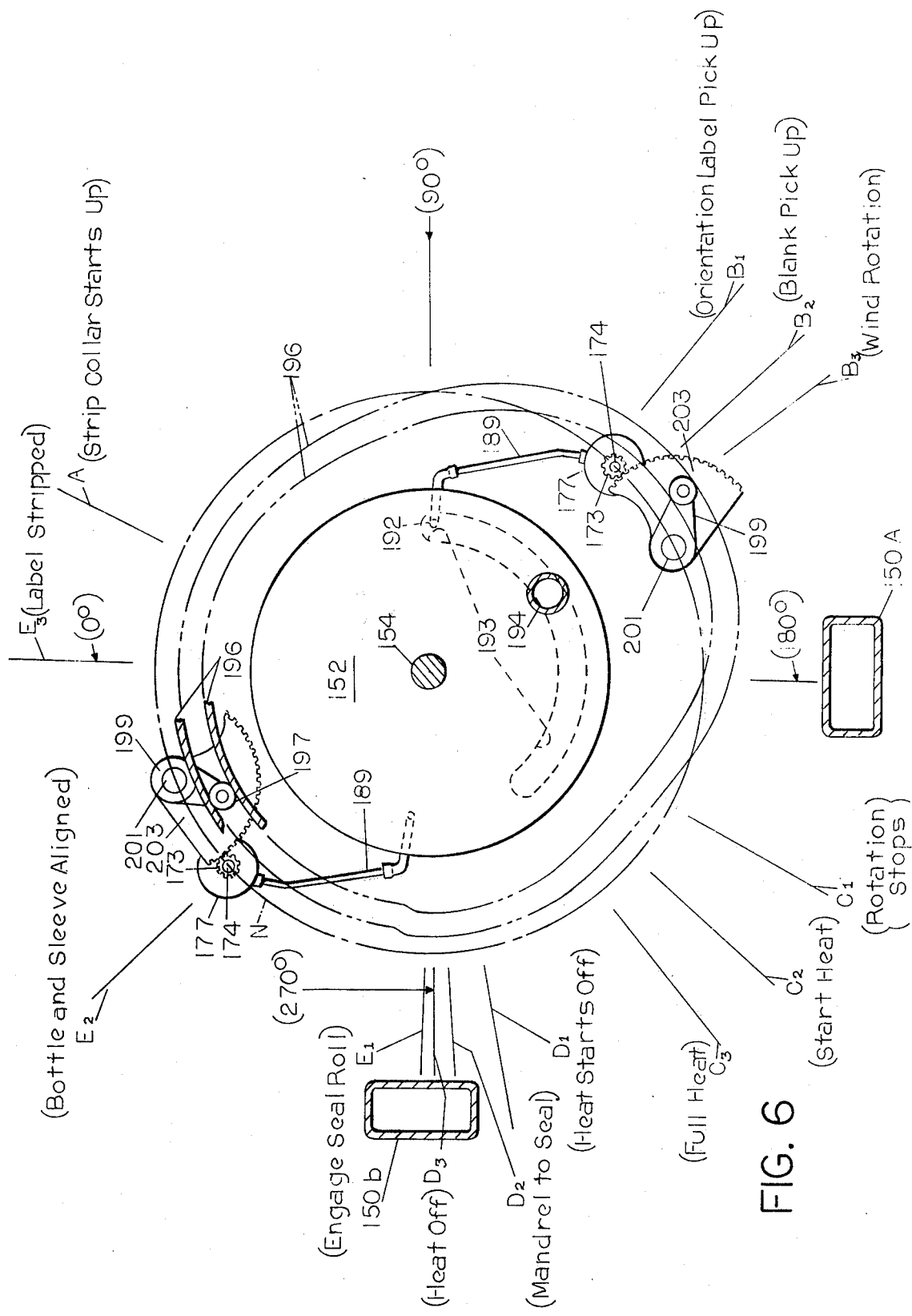
FIG. 6 is a top plan view illustrating the mandrel drive and cam assembly and the vacuum manifold.
Figure 8:
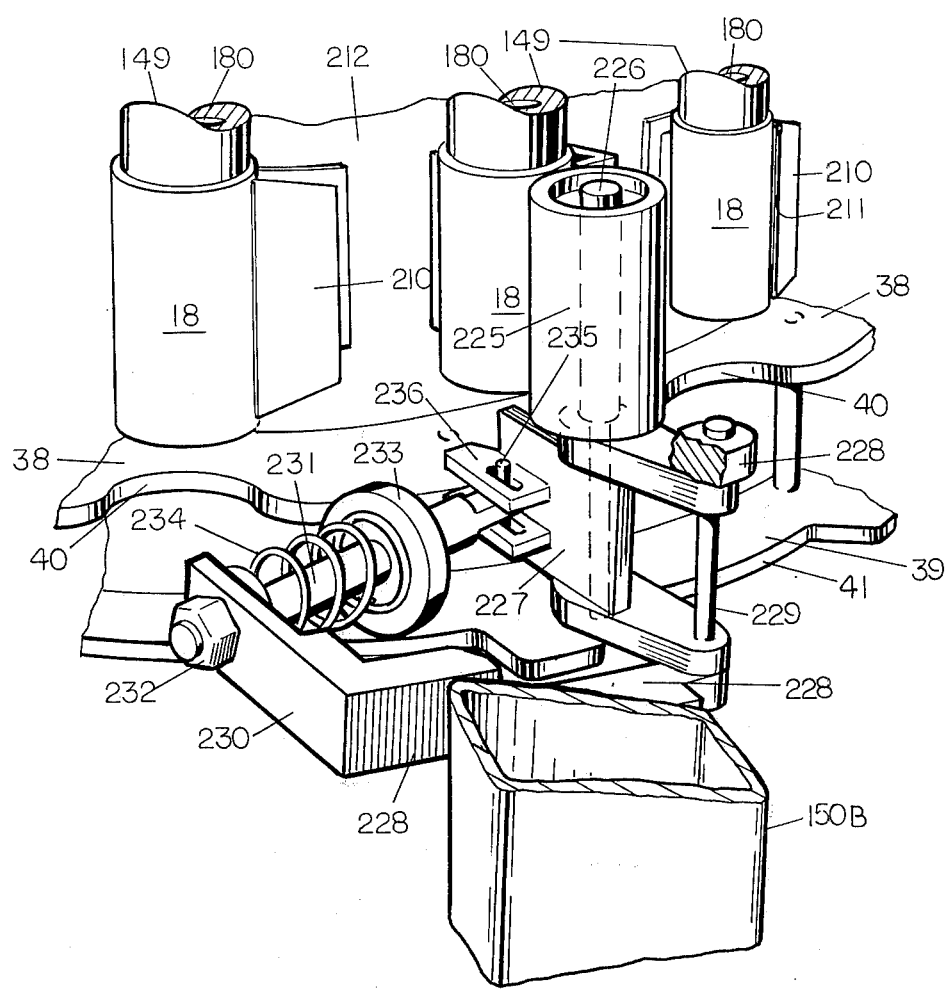
FIG. 8 is a fragmentary perpsective view of the mandrels and press-roll mechanism for completing the vertical seams on the plastic sleeves made on the mandrels.

Referring to FIG. 6, the endless path of cam 196 surrounds the center shaft 154 of the machine, the major part of the cam path being shown in phantom outline. During rotation of the turret (spider 172), cam follower 197, a part of each mandrel assembly, is moved along cam track 196. The path of the pivot pin 201 and mandrel spindle 174 is circular, shown by the path N on FIG. 6. The path of cam 196 is labelled, on FIG. 6, as the dashed orbital line. The mandrels orbit clockwise about machine center shaft 154 in path N. At the position shown in the upper part of FIG. 6, gear segment 203 is moved to its furthermost counter clockwise position, which it retains until the mandrel approaches the referenced 90° position, whereupon the cam path 196 begins to move, with respect to path N, so that gear 203 is actuated clockwise setting the mandrel into rotation. Upon reaching position B, mandrel position has been adjusted by rotation for picking up a label blank at the transfer point. At reference $B_2$, blank transfer begins at which time the arcuate vacuum manifold chamber 193 is connected with the mandrel to apply vacuum at the peripheral ports 185 of the mandrel (FIG. 9). This corresponds with the rotational location on the turret of the transfer station (FIGS. 3 and 11) whereat the leading edge or end of the label blank 18 is transferred onto and held on a mandrel 149. At reference $B_3$ cam path 196 imparts winding rotation to the mandrel. This rotation is transmitted by gear segment 203 which imparts approximately a full revolution by the time reference line $C_1$ is reached. At about this location, mandrel rotation stops. Correspondingly, the wound label on the mandrel is heated at the opposite ends and overlapped in orbital travel between reference $C_2$, $C_3$ and $D_1$. While mandrel rotation is stopped in orbital travel between reference $D_2$ and $E_1$, the overlapped seam portion of the label is moved past the seal roller for completing the sleeve's vertical seam. The quiescent state of the mandrel rotation continues past reference $E_3$, whereat the sleeve is stripped vertically downwardly from the mandrel and over the registered bottle underneath, in a manner to be presently described. Between reference $E_3$ and the 90° point, the gear segment 203 is reset to begin another cycle.

LABEL STRIPPING AND ASSEMBLY

Once the label sleeve is formed on the mandrel, it is stripped downwardly onto a bottle to assembled position for heat contraction. The stripping occurs after the bottle is brought into a pocket 40, 41 (FIG. 8) of the bottle positioning wheel by the feed star wheel 35.

Since the turret machine includes the rigid connection of bottle positioning wheel 38, 39 and the upper spider 172 (FIG. 4), pockets 40, 41 for the bottle are always in vertical, axial alignment with a mandrel 149 of the mandrel assembly. Therefore, orientation of the bottles by star wheel 35 will place the bottles into an axially registered position on the turret when seated in pockets 40, 41. This occurs at approximately reference line $E_2$ (FIG. 2). Thereafter, the sleeve label 18 is stripped axially downwardly over the bottle 10 and cap 11 by the hereinafter described device.

Figure 20:
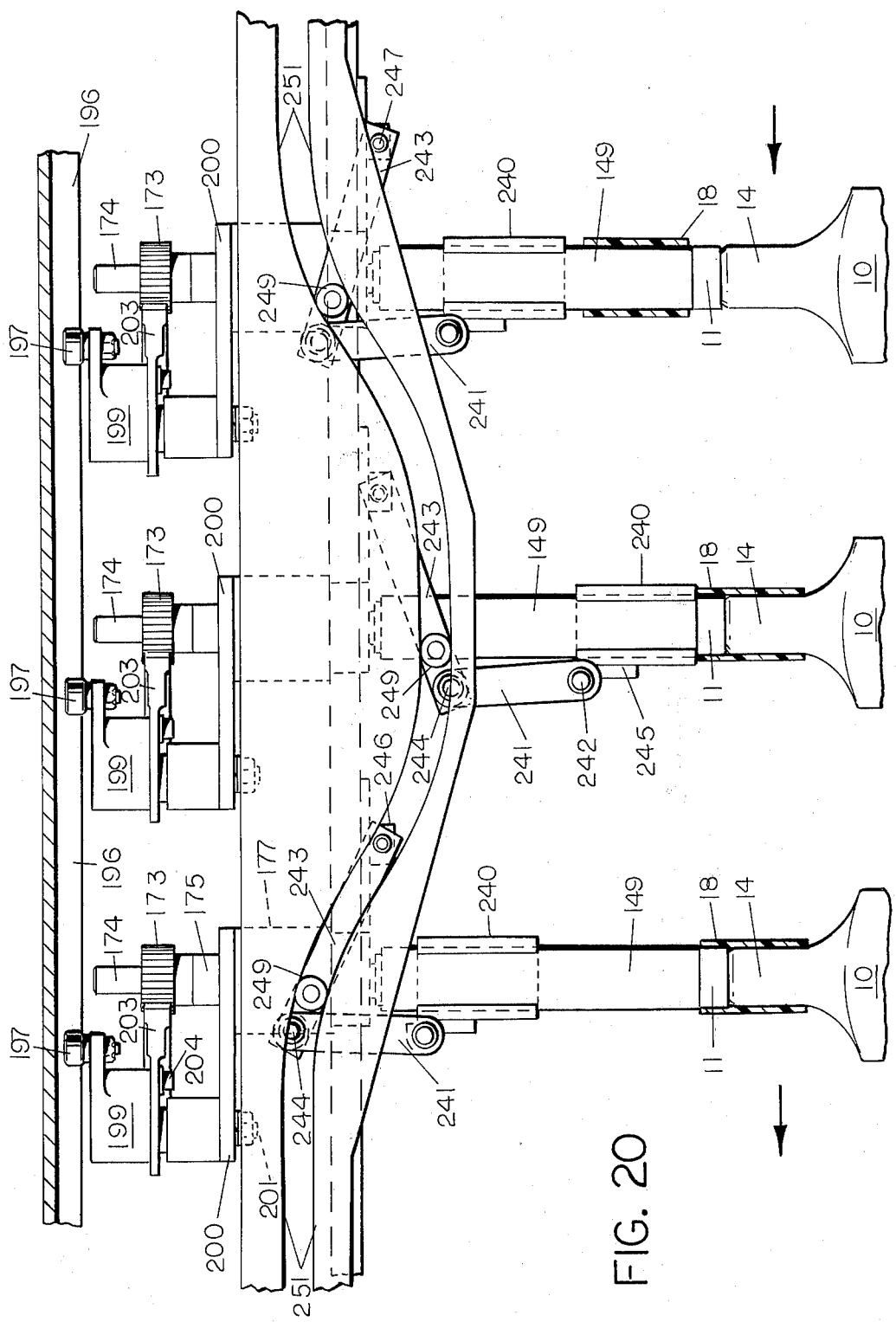
FIG. 20 is a side elevational view of the stripper mechanism for removing a sleeve from the mandrel and placing it over an underlying bottle.

Referring to FIGS. 9, 19 and 20, each mandrel unit includes a telescopically arranged C-shaped stripper collar 240, normally carried in the retracted, uppermost position shown on FIG. 9. Collar 240 is attached at its lateral boss 245 to one end of a linkage comprised of vertical link 241 and crank link 243 by pivot pin 242. Link 241 is pin connected at its opposite end to the movable end of horizontal crank link 243 by a lateral pivot pin 244. The other end of link 243 is pivotally connected by a pivot pin 247 to a projecting boss 246 that is anchored firmly on the mandrel column (FIG. 9). The crank link 243 includes a laterally projecting boss 248 intermediate its ends which has a cam roller 249 pivoted thereon by a roller pin 250. Cam roller 249 runs in cam track 251 which is an endless (circular) horizontal cam path extending around the turret of the machine FIG. 9 and FIGS. 1–3). Cam 251 rises and falls vertically, as illustrated somewhat schematically on FIG. 20, for driving the collar 240 on the mandrels between lowered (stripping) and raised (inactive) positions. Cam 251 normally carries roller 249 along a raised path (FIG. 19) as is also indicated at the extreme ends of FIG. 20. The mandrels move from right-to-left on FIG. 20. After the label sleeve 18 is formed on the mandrel 149, (right-hand position, FIG. 20), and bottle 10 is registered axially with the mandrel (as shown), cam track 251 descends to the position shown in the center of FIG. 20. Cam roller 249, following the cam contour, pivots crank link 243 downwardly (counter clockwise) driving vertical link 241 downwardly. This propels C-shaped collar 240 axially along mandrel 149 from its inactive, raised position to its lowered sleeve stripping position, pushing the label sleeve 18 in that direction and eventually telescopically encircling the bottle neck and cap skirt thereby, as shown in the middle of FIG. 20. This is the assembled position for the shrinkable label sleeve on the bottle and cap. The assembly of sleeve, bottle, etc. is then ready to be transferred through the third and fourth star wheels 45, 48 and onto conveyor 53 by which it is carried to the heating unit 54. With further movement (left-to-right), cam track 251 raises, picking up roller 249 and raising C-shaped stripping collar 240 to the raised, inactive position for the next cycle. The operation of stripper collar in moving the label sleeve from the mandrel onto the bottle occurs in the rotation of the turret between the reference lines $E_2$ and A on FIG. 6.

The cam track 251 is circular and fabricated onto the inside facings of the machine frame vertical columns 150A-D (FIG. 1) by the threaded machine screws 260 extending through horizontal slots 261 on a backing plate 262 and into threads on cam member 251. The elongated slots 261 in the frame backing plate 262 allow a circumferential adjustment of the cam 251 with respect to the turret for advancing or retarding adjustments in the timing of sleeve stripping.

ADHESIVE APPLICATION

As was mentioned earlier, the pilfer-proof feature of the label on the bottle is enhanced by attaching the lower label sleeve portion below the score line 84 onto the neck surface of the bottle for preventing movement of the label on the bottle relative to any movement of the closure. Referring to FIGS. 1 and 24, the sleeve is attached to the bottle by adhesive that is issued in a spot or gob onto the neck area as the bottle is traveling into the star wheel 24 on the infeed conveyor 21. The adhesive is preferably a tacky or pressure-sensitive type of adhesive that will be operable upon the shrinking of the sleeve label over the region of the adhesive, the shrinking being a firm gripping action on the area treated with the adhesive material. One example of adhesive mentioned earlier herein in the aqueous emulsion type which dries to a tacky condition at the time the label is applied to the bottle. The adhesive is supplied to the storage vat of the control unit 268 which contains a pulse-pump and control. The adhesive is fed into the hose 267 connected to a glue gun nozzle 265. Nozzle 265 is supported in position opposite a neck area of the bottle by a vertical support stand 266. The unit described is conventional equipment, which includes a conventional photocell and light beam combination spaced across the width of conveyor 21, the control light beam being tripped (broken) by the front edge of the bottle as it approaches a pocket of the first star wheel 24. As the bottle trips the photo-electric control circuit, the valve of the glue gun operates to fire a quantity or spot 269 of adhesive at the bottle surface opposite the nozzle 265 of the glue gun. Each bottle is treated, as shown schematically on the series of FIGS. 24–26. After the sleeve label is telescopically placed over the adhesive spot 269 (FIG. 25) and the label is heated in the heater unit 54 (FIG. 26), the shrinkage of the label into surface engagement forms an adhesive bond between the surface of the bottle neck 14 and the interior surface of the applied label 18.

MACHINE DRIVE

Figure 5:
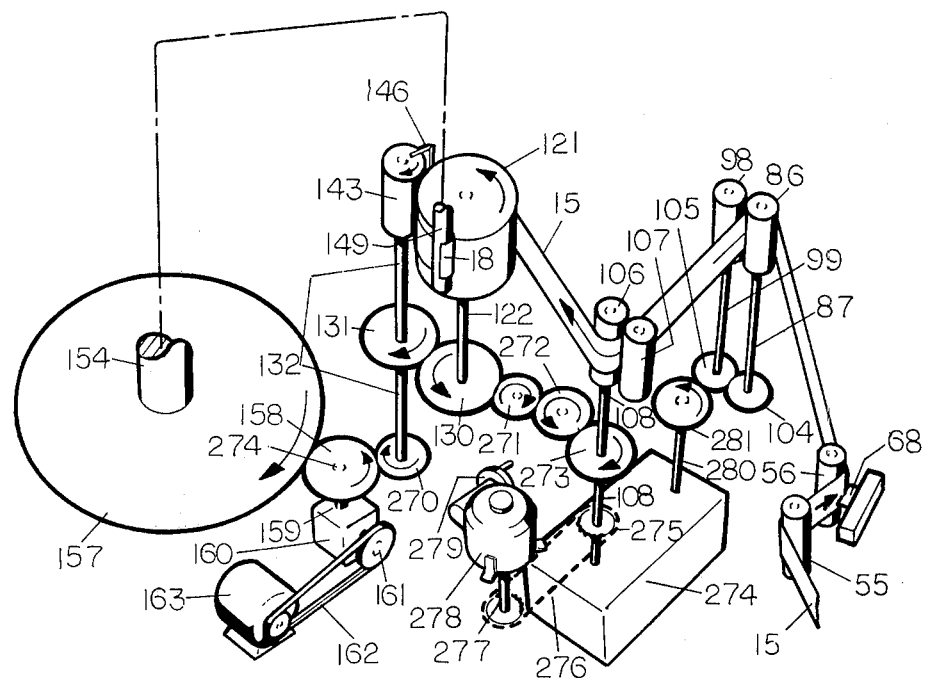
FIG. 5 is a schematic drawing, in perspective, showing the drive system for operating the various components of the machine.
Figure 7:
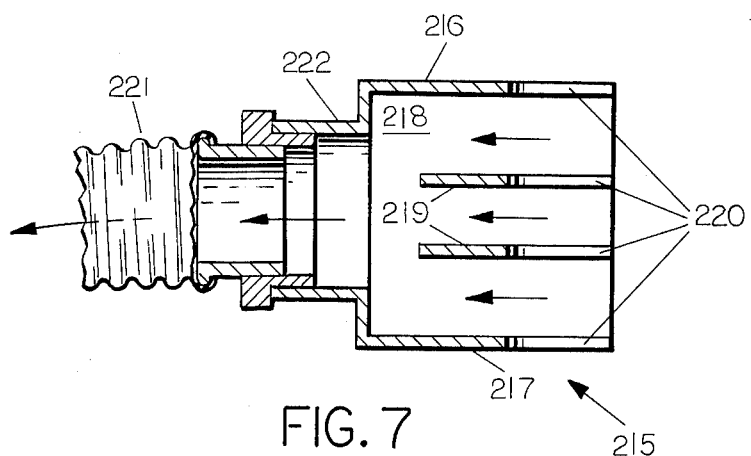
FIG. 7 is a sectional elevational view taken along line 7—7 on FIG. 3.

The power drive for the bottle handling, the turret, the web handling and processing and the web feeding mechanisms is shown schematically on FIG. 5. A synchronous electric main drive motor 163 is drivingly connected by power transmission means 162 (belt or chain) at the input shaft 161 of the power transmission 160. The output shaft 159 of the transmission is connected to drive gear 158 is mesh with machine bull gear 157 which rotatably drives the turret of the machine and operates the mandrels 149 in their orbital path about the shaft 154. Transmission drive gear 158 also meshes with a gear 270 on the shaft 132 of the rotary knife assembly for rotating the cylinder 143. The directions of rotation of the elements of the machine, schematically shown, are indicated by the arrows on FIG. 5. Gear 131 of the rotary knife is in mesh with gear 130 on shaft 122 of feed drum 121. Power is transmitted from gear 130 to the shaft 108 through its gear 273 by a cooperating pair of idler gears 271 and 272. The power transmitted to the shaft 108 operates the rotary pleating roll 106. Shaft 108 is also the input shaft of a standard PIV (positive infinitely variable) transmission unit 274 having an indexing gear 275. The rotation of gear 275 inside the transmission unit 274 in either direction will advance or retard the phase position of output shaft 280. Gear 275 is controlled by an indexing control motor 278 operated by manual control 279.

Power output of the transmission 274 at shaft 280 is transmitted by a gear 281 in mesh with gear 105 on the pull rolls 98. Roll 98 operates with roll 86 through gear 104 in mesh with gear 105 for pulling the web 15 through the knife device 68 and moving the web into the pleating rolls 106 and 107 establishing the speed and phase position of the web onto the feed drum 121.

The conveyors 21 and 53 for infeed of the bottles to the turret machine and outfeed of the bottles therefrom and through heating unit 54 are powered by their separate electric drive motors (not shown) at a speed compatable with the machine production rate. For this purpose the conveyors may be operated at a synchronous speed as a "slave" off the main drive motor 163, which establishes the production rate of the machine. The powered star wheels 24, 35, 45 and 48 are synchronously operated by known suitable powered transmission means (not shown).

As may be seen from the description of the machine, the invention provides for making a labelled, pilfer-proof container by first providing a web of a pre-printed, heat shrinkable organic thermoplastic material of predetermined width and thickness. The web is scored lengthwise at a predetermined lateral position thereon to form a running score line in the form of a partial-depth slit corresponding to a predetermined height location on the labels formed from the web. At about the same time, the web is provided with transverse pleats at spaced apart intervals of its length but less than a label length of the material. Lengths are cut from the web to make label blanks, each blank having plural transverse pleats thereon. The label blanks are each wrapped on a mandrel with the score line extending circumferentially of the mandrel and the score line surface of the web placed adjacent the mandrel surface so that the score line is not readily visible at the outside facing surface of the label wrapped on the mandrel. The plural pleats on the label extend generally in an axial direction of the label on the mandrel. The ends of the label blank are overlapped as the blank is wound around the mandrel and the overlapping ends joined to each other by heat applied at their open interface before joining. The heat welds the ends together as a seam and the seam is pressed by contact with a roller means. The sleeve label is stripped axially and downwardly from the mandrel over the top end of a container in underlying coaxial alignment with the mandrel. In the instance of the example of this disclosure, the container is a bottle with a screw cap on the neck end thereof and the sleeve is axially positioned thereon such that the circumferential internal score line of the label sleeve is adjacent the annular lower terminal edge of the cap. The label sleeve fits relatively loosely over the cap skirt and bottle neck. The label sleeve is then heated sufficiently to shrink it into snug surface engagement with the bottle neck and cap skirt, the pleats in the label sleeve containing any wrinkling that may occur to provide a good quality shrunken label. The label may be adhesively affixed to the neck of the bottle, whereby unscrewing movement of the cap will sever the label along the score line and separate the label into upper and lower portions, the lower portion being affixed to the neck of the bottle. Such severing of the label will provide visual indication that the bottle has been opened (pilfered).

The apparatus of the invention provides for applying heat shrinkable materials onto the neck, shoulder and cap contours of a cold container in a practical and efficient manner at production rates resulting in a satisfactory label and/or pilfer-proof covering on a container.

Having described a preferred embodiment or embodiments of the invention, other and further modifications thereof may be resorted to without departing from the spirit and scope of the invention set forth in the appended claims.

What is claimed:

1. Apparatus for applying sleeves to containers comprising:
   means for moving an elongated web of flexible sheet-like material in a longitudinal direction,
   means engaging said moving web for carrying it in a feed path defined by an endless surface, said means including a vacuum means connected to said endless surface for holding the web thereon,
   rotary knife means cooperating with the endless web-carrying surface for cutting the web thereon across its width and severing a sleeve blank from the web,
   a turret rotatably supported on a vertical shaft,
   a plural mandrel means in circular array on said turret, each mandrel means having an annular mandrel surface rotatable about an axis parallel with said shaft and movable in an orbit that is tangent with the feed path of said carrying means thereat engageable with the leading portion of a sleeve blank, said mandrel means including a vacuum means for holding said engaged leading portion on its annular surface, the peripheral dimension of said annular surface being less than the length of the sleeve blank,
   means connected to said rotatable mandrels operable for winding said sleeve blank thereon,
   heater means individual to each mandrel means comprising an elongated air nozzel connected to a source of heated air and operable in response to wrapping the sleeve blank on the mandrel surface for blowing hot air onto the overlapping surfaces of the leading and trailing end portions of the sleeve blank on the mandrel, said heated end portions heat sealing one to the other on the mandrel in seam fashion, thereby forming a hollow sleeve,
   pocketed wheel means connected on the turret in coaxial relation to the mandrels and rotatable about said shaft, said wheel means including plural container receiving pockets corresponding to the mandrels and in vertical registry therewith,
   guide means for engaging the containers and inserting them in said pockets of the wheel means with the axis of the containers disposed vertically and with the axial end thereof adjacent the mandrel in substantial axial registry therewith, said guide means retaining the containers in said pockets for partial orbital movement with the mandrels, and
   stripper means individual to each mandrel and operable for axially vertically downwardly stripping the hollow sleeve from the mandrel and telescopically encircling the said container.

* * * * *